(12) United States Patent
Pfaff et al.

(10) Patent No.: US 11,648,887 B2
(45) Date of Patent: May 16, 2023

(54) DISPLAY INTEGRATED INTO DOOR

(71) Applicant: CLARK EQUIPMENT COMPANY, West Fargo, ND (US)

(72) Inventors: John Pfaff, Bismarck, ND (US); Dennis Agnew, Moffit, ND (US); Joel S. Honeyman, Horace, ND (US)

(73) Assignee: CLARK EQUIPMENT COMPANY, West Fargo, ND (US)

( * ) Notice: Subject to any disclaimer, the term of this patent is extended or adjusted under 35 U.S.C. 154(b) by 0 days.

(21) Appl. No.: 17/096,722

(22) Filed: Nov. 12, 2020

(65) Prior Publication Data

US 2021/0138969 A1 May 13, 2021

Related U.S. Application Data

(60) Provisional application No. 62/934,065, filed on Nov. 12, 2019.

(51) Int. Cl.
| | | |
|---|---|---|
| *B60R 11/02* | (2006.01) | |
| *B60K 35/00* | (2006.01) | |
| *B60J 5/00* | (2006.01) | |
| *B60J 5/02* | (2006.01) | |
| *B60R 11/00* | (2006.01) | |

(52) U.S. Cl.
CPC ............ *B60R 11/0229* (2013.01); *B60J 5/00* (2013.01); *B60K 35/00* (2013.01); *B60J 5/02* (2013.01); *B60K 2370/1438* (2019.05); *B60K 2370/31* (2019.05); *B60K 2370/334* (2019.05); *B60K 2370/794* (2019.05); *B60R 2011/0021* (2013.01); *B60R 2011/0026* (2013.01); *B60R 2300/202* (2013.01); *B60Y 2200/415* (2013.01)

(58) Field of Classification Search
None
See application file for complete search history.

(56) References Cited

U.S. PATENT DOCUMENTS

| | | |
|---|---|---|
| 4,769,700 A | 9/1988 | Pryor |
| 5,065,326 A | 11/1991 | Sahm |
| 5,359,517 A | 10/1994 | Moriya et al. |

(Continued)

FOREIGN PATENT DOCUMENTS

| | | |
|---|---|---|
| DE | 102016011354 | 3/1918 |
| EP | 3161569 A1 | 5/1917 |

(Continued)

OTHER PUBLICATIONS

Invitation to Pay Additional Fees and, where applicable, Protest Fee, including Communication relating to the results of the Partial International Search Report and Provisional Opinion accompanying the partial search result for International Application No. PCT/US2020/060259, dated Feb. 4, 2021, 13 pages.

(Continued)

*Primary Examiner* — Reza Aghevli
(74) *Attorney, Agent, or Firm* — John Veldhuis-Kroeze; Westman, Champlin & Koehler, P.A.

(57) ABSTRACT

Power machines and loaders having doors with an integrated display that allows the display of information, such as gauges, user inputs, mapped obstacles, boundaries, etc., that allows the operator of the machine to see the displayed information closer to the line of sight with the work area. The display can show augmented reality information about a worksite.

21 Claims, 32 Drawing Sheets

(56) References Cited

U.S. PATENT DOCUMENTS

| | | |
|---|---|---|
| 5,483,455 A | 1/1996 | Lay et al. |
| 5,615,116 A | 3/1997 | Gudat et al. |
| 5,648,901 A | 7/1997 | Gudat et al. |
| 5,680,313 A | 10/1997 | Whittaker et al. |
| 5,956,250 A | 9/1999 | Gudat et al. |
| 5,987,383 A | 11/1999 | Keller et al. |
| 6,076,030 A | 6/2000 | Rowe |
| 6,523,765 B1 | 2/2003 | Kurenuma et al. |
| 6,728,607 B1 | 4/2004 | Anderson |
| 6,778,097 B1 | 8/2004 | Kajita et al. |
| 6,934,615 B2 | 8/2005 | Flann et al. |
| 7,516,563 B2 | 4/2009 | Koch |
| 7,578,079 B2 | 8/2009 | Furem |
| 7,792,607 B2 | 9/2010 | Han et al. |
| 8,195,358 B2 | 6/2012 | Anderson |
| 8,195,364 B2 | 6/2012 | Norris et al. |
| 8,200,428 B2 | 6/2012 | Anderson |
| 8,407,157 B2 | 3/2013 | Anderson |
| 8,467,928 B2 | 6/2013 | Anderson |
| 8,478,493 B2 | 7/2013 | Anderson |
| 8,510,034 B2 | 8/2013 | Norris et al. |
| 8,666,587 B2 | 3/2014 | Anderson |
| 8,744,626 B2 | 6/2014 | Johnson et al. |
| 8,918,246 B2 | 12/2014 | Friend |
| 8,930,043 B2 | 1/2015 | Everett et al. |
| 8,983,738 B2 | 3/2015 | Avitzur et al. |
| 9,026,315 B2 | 5/2015 | Anderson |
| 9,052,716 B2 | 6/2015 | Tanaka et al. |
| 9,098,080 B2 | 8/2015 | Norris et al. |
| 9,185,845 B2 | 11/2015 | Van Mill et al. |
| 9,274,524 B2 | 3/2016 | Anderson |
| 9,332,691 B2 | 5/2016 | Fukuda et al. |
| 9,465,129 B1 | 10/2016 | Olsson et al. |
| 9,709,969 B2 | 7/2017 | Anderson et al. |
| 9,752,303 B2 | 9/2017 | Jackson |
| 9,804,606 B2 | 10/2017 | Kanai et al. |
| 9,824,490 B1 | 11/2017 | Côté et al. |
| 9,983,589 B2 | 5/2018 | Foster et al. |
| 10,031,525 B2 | 7/2018 | Dix et al. |
| 10,066,367 B1 | 9/2018 | Wang et al. |
| 10,088,845 B2 | 10/2018 | Pack et al. |
| 10,635,258 B2 | 4/2020 | Hokkanen et al. |
| 10,828,969 B2 * | 11/2020 | Erhardt ............... B60J 5/02 |
| 11,339,036 B2 | 5/2022 | Hofmeister et al. |
| 2001/0008346 A1 | 7/2001 | Martin, Jr. |
| 2003/0192732 A1 | 10/2003 | Warkentine |
| 2004/0008412 A1 | 1/2004 | Jiang et al. |
| 2004/0068352 A1 | 4/2004 | Anderson |
| 2006/0178823 A1 | 8/2006 | Eglington et al. |
| 2008/0191514 A1 * | 8/2008 | Liebl ............... B60J 5/0487 |
| | | 296/146.1 |
| 2009/0108562 A1 | 4/2009 | Hagenbuch |
| 2011/0233963 A1 * | 9/2011 | Yamashita ......... B62D 33/0617 |
| | | 296/190.11 |
| 2014/0188333 A1 * | 7/2014 | Friend ............... E02F 9/261 |
| | | 701/34.4 |
| 2014/0348584 A1 | 11/2014 | Fritz et al. |
| 2015/0045992 A1 | 2/2015 | Ashby et al. |
| 2015/0376868 A1 | 12/2015 | Jackson |
| 2016/0002878 A1 | 1/2016 | Harper |
| 2016/0138429 A1 | 5/2016 | Conway et al. |
| 2016/0176338 A1 | 6/2016 | Husted et al. |
| 2016/0187989 A1 * | 6/2016 | Kim ............... G06F 3/0304 |
| | | 345/173 |
| 2016/0282874 A1 | 9/2016 | Kurata et al. |
| 2017/0017239 A1 | 1/2017 | Kanai et al. |
| 2017/0088147 A1 | 3/2017 | Tentinger et al. |
| 2017/0090479 A1 | 3/2017 | Wilcox et al. |
| 2017/0131718 A1 | 5/2017 | Matsumura et al. |
| 2017/0168501 A1 | 6/2017 | Ogura et al. |
| 2017/0241448 A1 | 8/2017 | Kondo et al. |
| 2017/0261986 A1 | 9/2017 | Gerrish |
| 2017/0285655 A1 | 10/2017 | Katou et al. |
| 2017/0325443 A1 | 11/2017 | Crinklaw et al. |
| 2017/0339820 A1 | 11/2017 | Foster et al. |
| 2017/0344221 A1 | 11/2017 | Hokkanen et al. |
| 2018/0024549 A1 | 1/2018 | Hurd |
| 2018/0114047 A1 * | 4/2018 | Kim ............... G06V 40/1335 |
| 2018/0134252 A1 * | 5/2018 | Theodosiou ............ E05F 15/00 |
| 2018/0178648 A1 * | 6/2018 | Waco ............... B60K 35/00 |
| 2018/0182248 A1 | 6/2018 | Kanai et al. |
| 2018/0206392 A1 | 7/2018 | Matsuzaki |
| 2018/0217670 A1 | 8/2018 | Cho et al. |
| 2018/0258610 A1 | 9/2018 | Elkins |
| 2018/0299894 A1 | 10/2018 | Takase et al. |
| 2019/0032304 A1 | 1/2019 | Bolz et al. |
| 2019/0135091 A1 * | 5/2019 | Erhardt ............... E05D 15/581 |
| 2019/0276281 A1 | 9/2019 | Hofmeister et al. |
| 2019/0310737 A1 * | 10/2019 | Jeong ............... G06F 3/0418 |
| 2020/0269695 A1 * | 8/2020 | Pfaff ............... G06F 3/0488 |
| 2021/0031628 A1 * | 2/2021 | Herrmann ............... G01C 3/08 |
| 2021/0047804 A1 | 2/2021 | Canepari |

FOREIGN PATENT DOCUMENTS

| | | |
|---|---|---|
| EP | 3428033 A1 | 1/1919 |
| EP | 3 020 875 A1 | 5/2016 |
| EP | 3 252 238 A1 | 12/2017 |
| JP | 2016089389 A | 5/1916 |
| JP | H10212740 A | 8/1998 |
| WO | WO 2015/200440 | 12/2015 |

OTHER PUBLICATIONS

Notification of Transmittal of the International Search Report and the Written Opinion of the International Searching Authority, or the Declaration for International Application No. PCT/US2020/020139, dated May 18, 2020, 17 pages.

Notification of Transmittal of the International Search Report and the Written Opinion of the International Searching Authority, or the Declaration for International Application No. PCT/US2020/037581, dated Sep. 16, 2020, 17 pages.

Notification of Transmittal of the International Search Report and the Written Opinion of the International Searching Authority, or the Declaration for International Application No. PCT/US2020/060259, dated Apr. 20, 2021, 20 pages.

Invitation to Pay Additional Fees and, Where Applicable, Protest Fee dated Dec. 18, 2019 for International Application No. PCT/US2019/045318 filed Aug. 6, 2019, 12 pages.

International Search Report and Written Opinion dated Mar. 18, 2020 for International Application No. PCT/US2019/045318 filed Aug. 6, 2019, 19 pages.

U.S. Appl. No. 17/632,737, filed Feb. 3, 2022, entitled "Display Integrated Into Door", 75 pages.

U.S. Patent Office issued prosecution for U.S. Appl. No. 16/803,518, filed Feb. 27, 2020, including: Non-Final Rejection dated Apr. 12, 2022, 12 pages; Final Rejection dated Oct. 7, 2021, 13 pages; Non-Final Rejection dated May 3, 2021, 18 pages; 43 pages total.

* cited by examiner

DISPLAY INTEGRATED INTO DOOR

CROSS-REFERENCE TO RELATED APPLICATION

This application claims priority to U.S. provisional application 62/934,065, filed on Nov. 12, 2019, the content of which is hereby incorporated by reference in its entirety.

BACKGROUND

This disclosure is directed toward power machines. More particularly, this disclosure is directed toward power machines including compact loaders with displays integrated into a cab door.

Power machines, for the purposes of this disclosure, include any type of machine that generates power for the purpose of accomplishing a particular task or a variety of tasks. One type of power machine is a work vehicle. Work vehicles are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Loaders, including compact and mini loaders, can be used to perform a variety of tasks using travel, lift, tilt, and auxiliary functions. Commonly, loaders are used to transport material and/or to perform various tasks with attached implements, including digging and other tasks. Often times, the work performed by a loader is repetitive in nature. For example, using a mower implement to mow an area typically requires repetitive control of the loader to control the travel of the machine, raising or lowering of a mower attachment, powering of the mower attachment, etc.

Some power machines include enclosed cabs with doors pivotally mounted to a cab frame. The doors can be opened to allow ingress into and egress out of the cab and closed to protect an operator from the environment. In some power machines, the door is positioned in the front of the cab and an operator looks through glass of the door to view the work area during operation. Frequently, display panels mounted in corners of the cab provide operational information to the operator. Maintaining situational awareness of the work area and power machine while also observing displayed information is important.

The discussion above is merely provided for general background information and is not intended to be used as an aid in determining the scope of the claimed subject matter.

SUMMARY

Disclosed embodiments include loaders, and systems used on power machines in the form of compact loaders that are configured to augment power machine control to accomplish repetitive tasks. In providing augmented control, a learning mode is initiated and a home position is set. A series or collection of machine operations required to perform an iteration or cycle of a work task are then learned. Subsequently, the loader can be commanded to automatically perform the series of recorded operations to perform the task as many times as specified to complete a work project.

Also disclosed are power machines and loaders having doors with an integrated display that allows the display of information, such as gauges, user inputs, mapped obstacles, boundaries, etc., allowing the operator of the machine to see the displayed information closer to the line of sight with the work area.

In accordance with an exemplary embodiment, a power machine (100; 200; 300; 400; 900; 1000; 1200; 1300; 1400; 1500; 1900) is disclosed. The power machine includes a cab (250; 1450; 1950) having a cab frame (1414; 1920) with an aperture (1416; 1904) formed on a front side of the cab to allow ingress into or egress from an operating station (1924) in the cab; a cab door (1410; 1510; 1710; 1810; 1910) coupled to the cab and being positionable between a closed position, in which the cab door covers at least a substantial portion of the aperture to prevent ingress and egress and an open position, in which the cab door is positioned to allow ingress and egress; a controller (370; 1070; 1270; 1470; 1514; 1516); and a display (1530; 1730; 1830; 1930) integrated into the cab door and in electrical digital communication with the controller, the display having display material (1531) configured to allow at least partial visibility through the display material of a work area outside of the cab, the display further configured to display operational information to an operator of the power machine under control of the controller.

In some embodiments, the power machine further includes an electrical cable (1512) including a plurality of conductors in communication with the controller and the display integrated into the cab door, wherein the electrical cable is capable of moving to maintain communication between the controller and the display when the cab door moves between the open and closed positions. In some embodiments, the cab door is coupled to the cab by hinges (1522) such that the cab door is pivotable between the closed and open positions, and the electrical cable extends between the cab door and the cab frame proximal to at least one of the hinges. In other embodiments, the cab door is coupled to the cab by rigid linkages (1922) which define a path of the cab door between the closed and open positions, wherein in open position the cab door is located above a seat (1958) of the operator station, and wherein the electrical cable extends through at least one rigid linkage.

In some embodiments, the display integrated into the cab door is configured to display augmented control information. Displaying augmented control information can include the display being configured to display mapped obstacles or obstructions (1002; 1304; 1306) from a pre-defined position of an operator positioned in the operating station of the cab.

In some embodiments, the power machine further comprises a layer (1528) of input sensing material positioned in alignment with the display (1530) and in response to sensing an operator's intention of selecting a portion of the display providing coordinates related to the display to the controller. In some such embodiments, the display and controller are configured to allow the operator, by the input through the layer of input sensing material, to select areas on the door where operational information or user inputs are displayed. In some embodiments, the input sensing material is capable of sensing an operator touching the input sensing material. In other embodiments, the input sensing material is capable of sensing an operator or an object manipulated by an operator in close proximity to the input sensing material.

In some embodiments, a second display (1940) is integrated into a glass window (1942) on a side of the power machine.

In accordance with another exemplary embodiment, a power machine (100; 200; 300; 400; 900; 1000; 1200; 1300; 1400; 1500; 1900) is disclosed. The power machine includes a cab (250; 1450; 1950) having a cab frame (1414; 1920); a controller (370; 1070; 1270; 1470; 1514; 1516); a transparent, concave surface (1412; 1502; 1932) on a front side of the cab; and a display (1530; 1730; 1830; 1930) coupled to the transparent, concave surface, the display having display material (1531) configured to allow at least partial visibility through the display material of a work area outside of the cab, the display further configured to display operational information, to an operator of the loader, under control of the controller.

In some embodiments, the transparent portion of the door assembly includes first and second layers (1504; 1506) of transparent material, and wherein the display (1530) is integrated between the first and second layers of transparent material.

In some embodiments, the transparent portion of the door assembly includes a layer of transparent material (1504; 1506), and wherein the display is attached to a surface of the layer of transparent material.

In some embodiments, the display is coupled to a transparent concave surface.

In some embodiments, the loader further includes an electrical cable (1512) having a plurality of conductors in communication with the controller and the display, wherein the electrical cable is capable of moving to maintain communication between the controller and the display when the door assembly moves between the open and closed positions. In some such embodiments, the door assembly is coupled to the cab frame by hinges (1522) such that the door assembly is pivotable between the closed and open positions, and the electrical cable extends proximate at least one hinge. In other such embodiments, the door assembly is coupled to the cab frame by rigid linkages (1922) which define a path of the door assembly between the closed and open positions, wherein in open position the door assembly is located above a seat (1958) of the cab, and the electrical cable extends through or along at least one rigid linkage.

In some embodiments, the display coupled to the transparent portion of the door assembly is configured to display augmented control information. In some such embodiments, the display being configured to display augmented control information includes the display being configured to display mapped obstacles or obstructions (1002; 1304; 1306) from a pre-defined position of an operator positioned in an operator seat of the cab.

In some embodiments, the power machine further includes infrared light curtain devices projecting an infrared light curtain proximate the concave surface in alignment with the display and in response to sensing an object using the infrared light curtain, the infrared light curtain provides coordinates related to the display to the controller. In some embodiments, the display and controller are configured to allow the operator, by input through the sensing the object using the infrared light curtain, to select areas on the door assembly where operational information or user inputs are displayed.

In some embodiments, the loader further includes a layer of touch sensitive material (1528) positioned on the transparent portion of the door assembly in alignment with the display and in response to sensing an operator touching the material providing coordinates related to the display to the controller. In some such embodiments, the display and controller are configured to allow the operator, by the input through the layer of touch sensitive material, to select areas on the door assembly where operational information or user inputs are displayed.

In accordance with another exemplary embodiment, a loader (100; 200; 300; 400; 900; 1000; 1200; 1300; 1400; 1500; 1900) is disclosed. The loader includes a cab (250; 1450; 1950) having a cab frame (1414; 1920); a cab door (1410; 1510; 1710; 1810; 1910) having a concave surface (1412; 1502; 1932) on an inside thereof, the cab door being coupled to the cab frame and configured to be moved between an open position allowing ingress into and egress out of the cab, and a closed position to prevent ingress into and egress out of the cab; a controller (370; 1070; 1270; 1470; 1514; 1516); a projection device (1402) coupled to the controller and configured to project operational information, under control of the controller, for viewing by an operator of the loader; and a transparent material (1404) integrated into the cab door and providing a projection surface onto which the projection device projects the operational information with the cab door in the closed position such that the operator of the loader can view the operational information while looking through the transparent material forward of the loader. The projection device can be positioned below an operator seat or to a side of an operator seat in some embodiments.

This Summary and the Abstract are provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

FIG. 23-1 is a diagrammatic illustration of a portion of a loader, according to another illustrative embodiment, having a door with an integrated display in electrical digital communication with a controller using an electrical cable.

FIG. 23-2 is a diagrammatic illustration of a portion of a loader, according to another illustrative embodiment, having a door with an integrated display in electrical digital communication with a controller using a wireless communication interface.

FIG. 24-1 is a diagrammatic illustration of the door shown in FIGS. 23-1 and 23-2 and showing an example display area and open glass area configuration and displayed information configuration.

FIG. 24-2 is a diagrammatic illustration of a portion of the door shown in FIG. 24-1, and further illustrating touch sensitive material aligned with an integrated door display.

FIG. 24-3 is a diagrammatic illustration of an integrated door display having infrared light curtain devices positioned to provide a user input without the use of a touch sensitive material.

Figure 30:
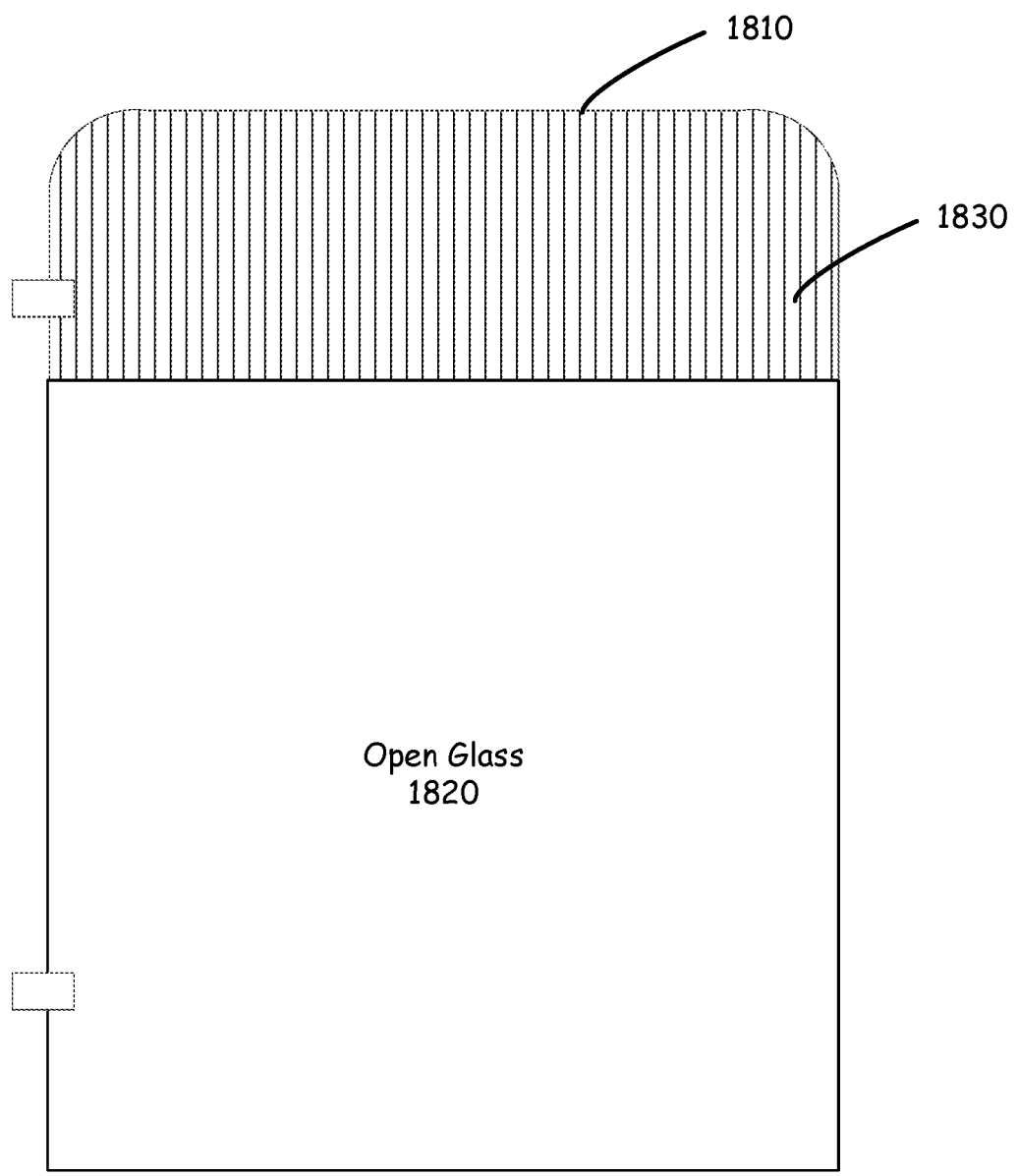

FIG. 30 diagrammatic illustration of another exemplary embodiment of a loader door having an integrated display covering a band at the top of the door.

Figure 31:
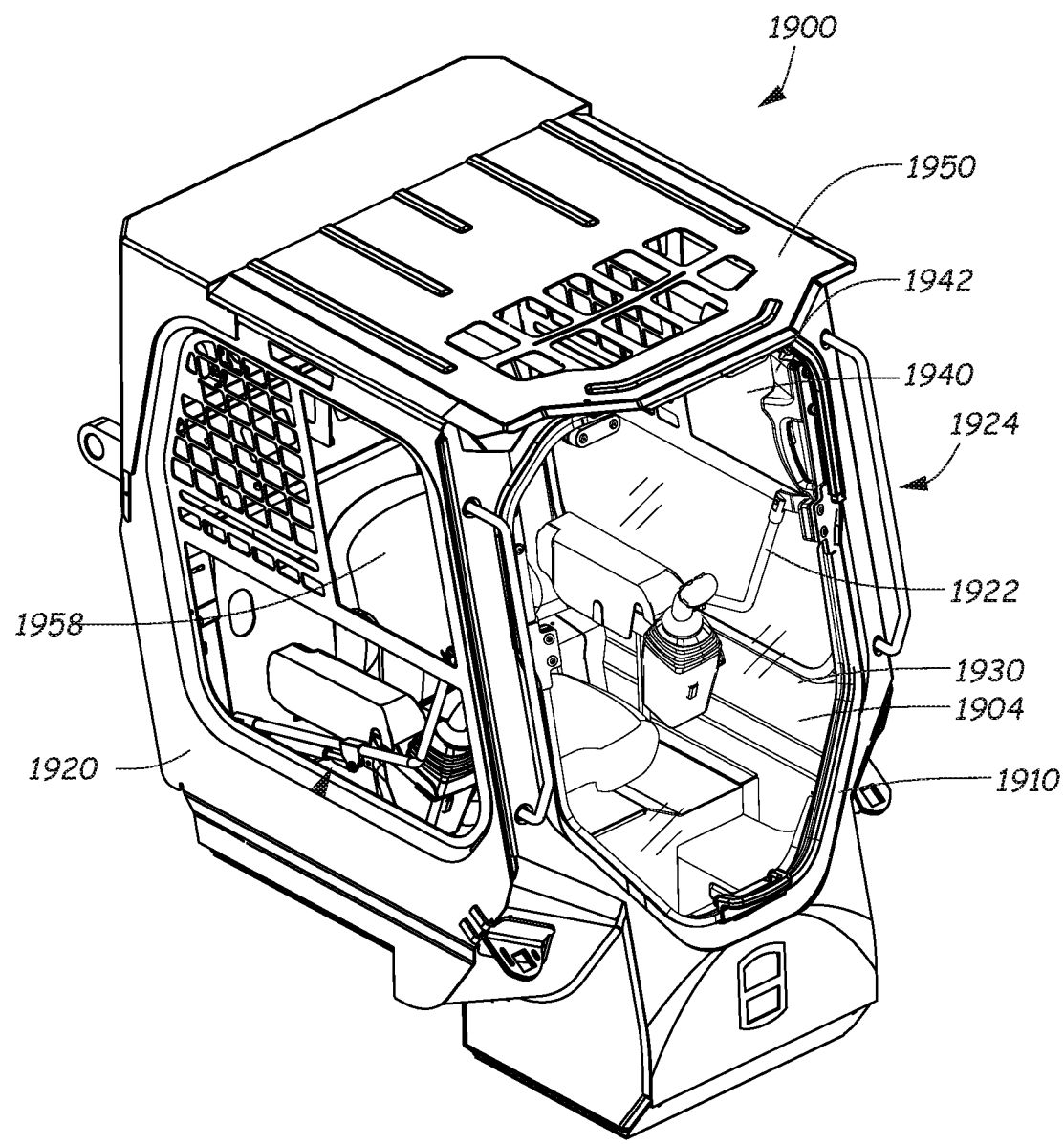
Figure 32:
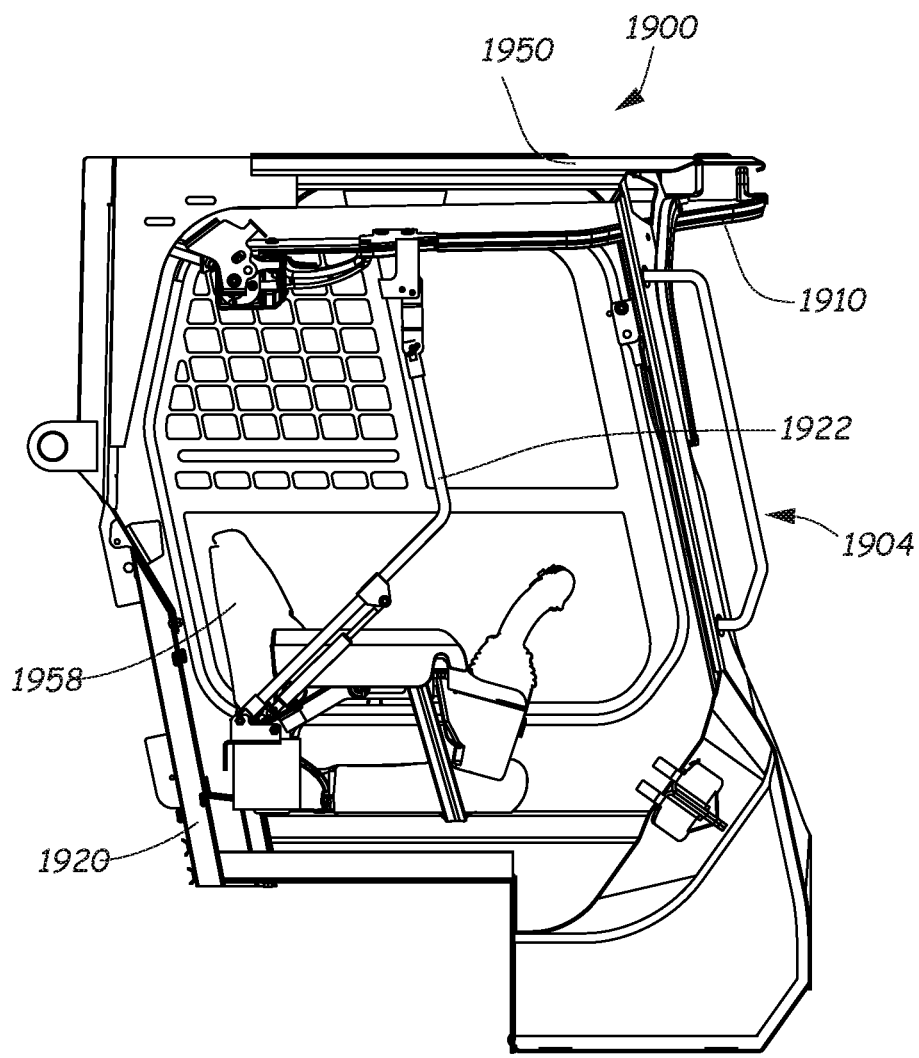

FIGS. 31 and 32 are perspective and side view illustrations of another cab having a display integrated into the door of the cab.

DETAILED DESCRIPTION

The concepts disclosed in this discussion are described and illustrated with reference to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items. Further, components described as "capable of" performing a task or function should be understood to include being "configured to" perform the task or function.

Disclosed embodiments include loaders, and systems used on loaders that are configured to augment loader control to accomplish repetitive tasks. In providing augmented control, a learning mode is initiated and a home position is set. In the learning mode, a series or collection of machine operations required to perform an iteration of a work task are learned. Subsequently, the loader can be commanded to automatically perform the series of recorded operations in order to repeatedly perform the task as many times as specified to complete a work project. Examples of tasks which can be learned include, but are not limited to, trailer loading, carry and dump operations, material transport (driving the loader from one position to another position), returning home, workgroup return to position for lift, tilt and auxiliary functions, implement or attachment work performed in rows such as mowing, grading and packing, etc.

Disclosed embodiments also include cab doors that are removably positioned over an opening at a front of cab that allows for ingress into and egress out of the cab. These cab doors include an integrated display panel positioned to display information in front of an operator such that the information is more within the operator's line of sight of the work area than is the case with conventional display panels mounted in upper or lower corners of the cab.

Figure 2:
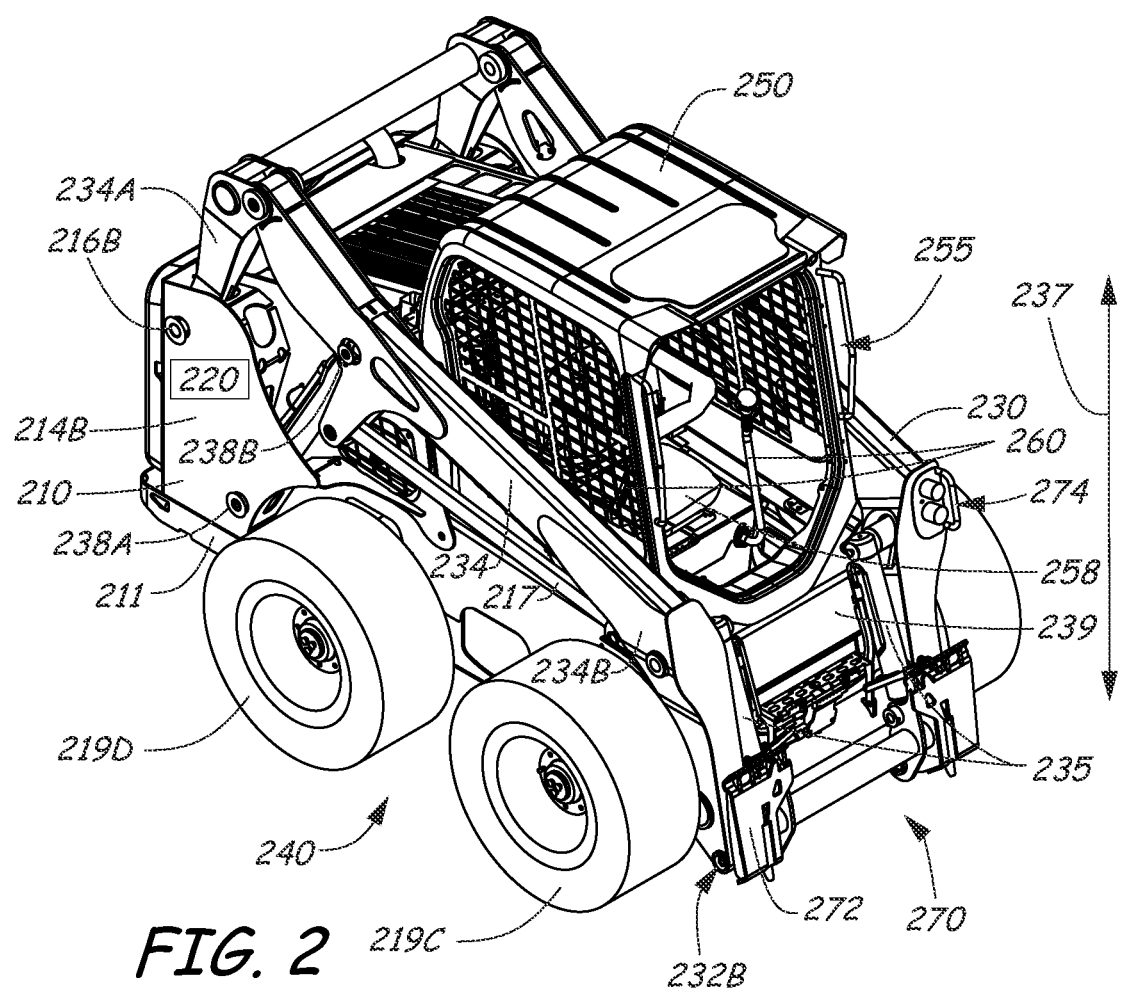
FIGS. 2-3 illustrate perspective views of a representative power machine in the form of a skid-steer loader of the type on which the disclosed embodiments can be practiced.
Figure 3:
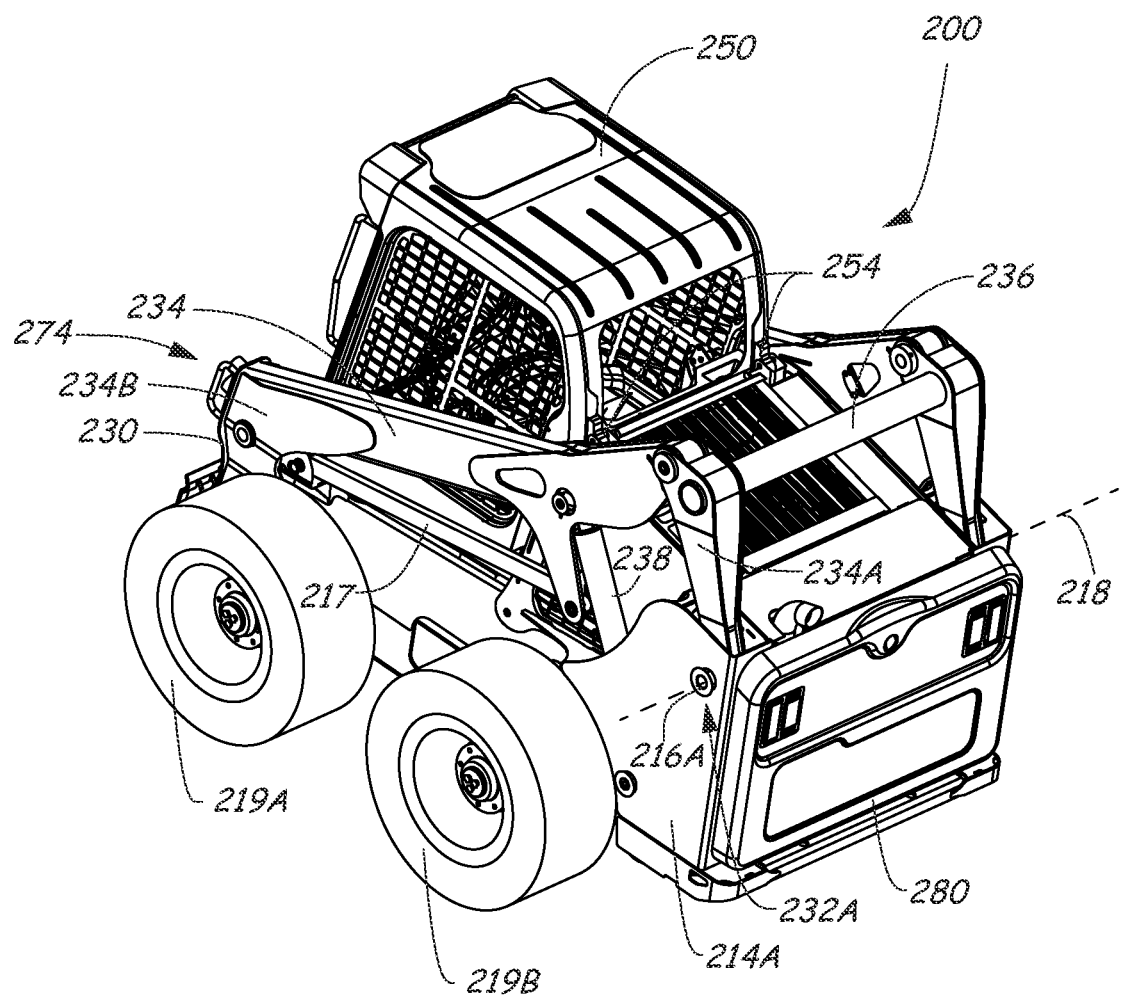

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is illustrated and discussed as being a representative power machine. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that is capable of providing power to the work element to accomplish a work task. One type of power machine is a self-propelled work vehicle. Self-propelled work vehicles are a class of power machines that include a frame, work element, and a power source that is capable of providing power to the work element. At least one of the work elements is a motive system for moving the power machine under power.

Figure 1:
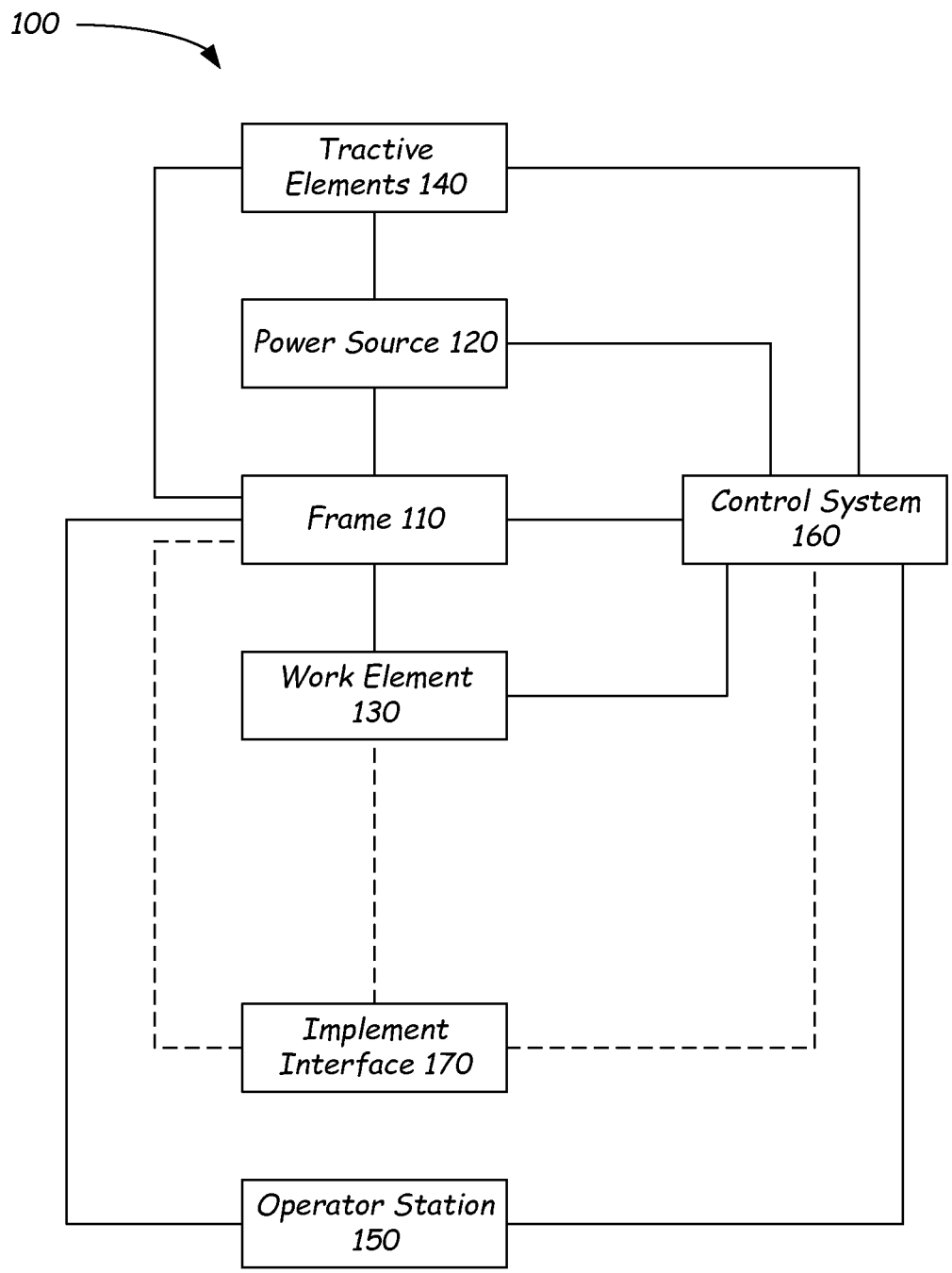
FIG. 1 is a block diagram illustrating functional systems of a representative power machine on which embodiments of the present disclosure can be advantageously practiced.

FIG. 1 is a block diagram that illustrates the basic systems of a power machine 100, which can be any of a number of different types of power machines, upon which the embodiments discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that are capable of performing a dedicated task. For example, some work vehicles have a lift arm to which an implement such as a bucket is attached such as by a pinning arrangement. The work element, i.e., the lift arm can be manipulated to position the implement for the purpose of performing the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that is capable of moving with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is configured to convert the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e. from a remotely located operator station) instead of or in addition to an operator station adjacent or on the power machine. This can include applications where at least some of the operator-controlled functions of the power machine can be operated from an operating position associated with an implement that is coupled to the power machine. Alternatively, with some power machines, a remote-control device can be provided (i.e. remote from both of the power machine and any implement to which is it coupled) that is capable of controlling at least some of the operator controlled functions on the power machine.

FIGS. 2-3 illustrate a loader 200, which is one particular example of a power machine of the type illustrated in FIG. 1 where the embodiments discussed below can be advantageously employed. Loader 200 is a skid-steer loader, which is a loader that has tractive elements (in this case, four wheels) that are mounted to the frame of the loader via rigid axles. Here the phrase "rigid axles" refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements.

Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Skid-steer loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220, the power system being capable of generating or otherwise providing power for operating various functions on the power machine. Power system 220 is shown in block diagram form but is located within the frame 210. Frame 210 also supports a work element in the form of a lift arm assembly 230 that is powered by the power system 220 and is capable of performing various work tasks. As loader 200 is a work vehicle, frame 210 also supports a traction system 240, which is also powered by power system 220 and is capable of propelling the power machine over a support surface. The lift arm assembly 230 in turn supports an implement interface 270, which includes an implement carrier 272 that is capable of receiving and securing various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices 260 to cause the power machine to perform various work functions. Cab 250 can be pivoted back about an axis that extends through mounts 254 to provide access to power system components as needed for maintenance and repair.

The operator station 255 includes an operator seat 258 and a plurality of operation input devices, including control levers 260 that an operator can manipulate to control various machine functions. Operator input devices can include buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 100 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to providing dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that are capable of including and/or interacting with the embodiments discussed below can have various different frame components that support various work elements. The elements of frame 210 discussed herein are provided for illustrative purposes and frame 210 is not the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200, in some embodiments is attached to the undercarriage 211 such as with fasteners or by welding the undercarriage to the mainframe. Alternatively, the mainframe and undercarriage can be integrally formed. Mainframe 212 includes a pair of upright portions 214A and 214B located on either side and toward the rear of the mainframe that support lift arm assembly 230 and to which the lift arm assembly 230 is pivotally attached. The lift arm assembly 230 is illustratively pinned to each of the upright portions 214A and 214B. The combination of mounting features on the upright portions 214A and 214B and the lift arm assembly 230 and mounting hardware (including pins used to pin the lift arm assembly to the mainframe 212) are collectively referred to as joints 216A and 216B (one is located on each of the upright portions 214) for the purposes of this discussion. Joints 216A and 216B are aligned along an axis 218 so that the lift arm assembly is capable of pivoting, as discussed below, with respect to the frame 210 about axis 218. Other power machines may not include upright portions on either side of the frame, or may not have a lift arm assembly that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements in the form of wheels 219A-D on either side of the loader 200.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is what is known as a vertical lift arm, meaning that the lift arm assembly 230 is moveable (i.e. the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e. along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

An implement interface 270 is provided proximal to a second end 232B of the lift arm assembly 234. The implement interface 270 includes an implement carrier 272 that is capable of accepting and securing a variety of different implements to the lift arm 230. Such implements have a complementary machine interface that is configured to be engaged with the implement carrier 272. The implement carrier 272 is pivotally mounted at the second end 232B of the arm 234. Implement carrier actuators 235 are operably coupled the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the excavator 200 to allow communication between a controller on an implement and electronic devices on the loader 200.

Figure 4:
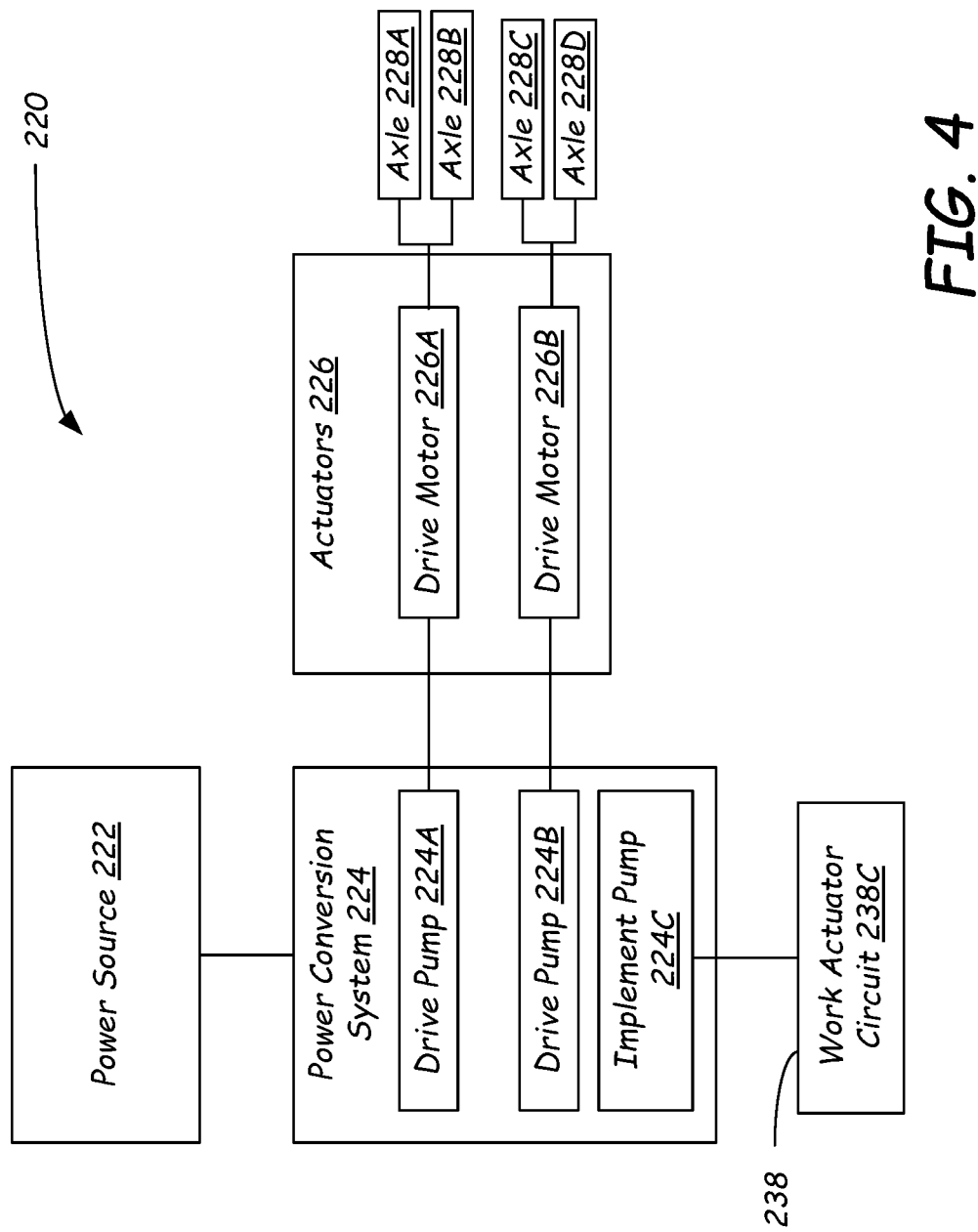
FIG. 4 is a block diagram illustrating components of a power system of a loader such as the loader illustrated in FIGS. 2-3.

Frame 210 supports and generally encloses the power system 220 so that the various components of the power system 220 are not visible in FIGS. 2-3. FIG. 4 includes, among other things, a diagram of various components of the power system 220. Power system 220 includes one or more power sources 222 that are capable of generating and/or storing power for use on various machine functions. On power machine 200, the power system 220 includes an internal combustion engine. Other power machines can include electric generators, rechargeable batteries, various other power sources or any combination of power sources that are capable of providing power for given power machine components. The power system 220 also includes a power conversion system 224, which is operably coupled to the power source 222. Power conversion system 224 is, in turn, coupled to one or more actuators 226, which are capable of performing a function on the power machine. Power conversion systems in various power machines can include various components, including mechanical transmissions, hydraulic systems, and the like. The power conversion system 224 of power machine 200 includes a pair of hydrostatic drive pumps 224A and 224B, which are selectively controllable to provide a power signal to drive motors 226A and 226B. The drive motors 226A and 226B in turn are each operably coupled to axles, with drive motor 226A being coupled to axles 228A and 228B and drive motor 226B being coupled to axles 228C and 228D. The axles 228A-D are in turn coupled to tractive elements such as wheels 219A-D, respectively. The drive pumps 224A and 224B can be mechanically, hydraulic, and/or electrically coupled to operator input devices to receive actuation signals for controlling the drive pumps.

The arrangement of drive pumps, motors, and axles in power machine 200 is but one example of an arrangement of these components. As discussed above, power machine 200 is a skid-steer loader and thus tractive elements on each side of the power machine are controlled together via the output of a single hydraulic pump, either through a single drive motor as in power machine 200 or with individual drive motors. Various other configurations and combinations of hydraulic drive pumps and motors can be employed as may be advantageous.

The power conversion system 224 of power machine 200 also includes a hydraulic implement pump 224C, which is also operably coupled to the power source 222. The hydraulic implement pump 224C is operably coupled to work actuator circuit 238C. Work actuator circuit 238C includes lift cylinders 238 and tilt cylinders 235 as well as control logic (such as one or more valves) to control actuation thereof. The control logic selectively allows, in response to operator inputs, for actuation of the lift cylinders and/or tilt cylinders. In some machines, the work actuator circuit also includes control logic to selectively provide a pressurized hydraulic fluid to an attached implement.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Figure 5:
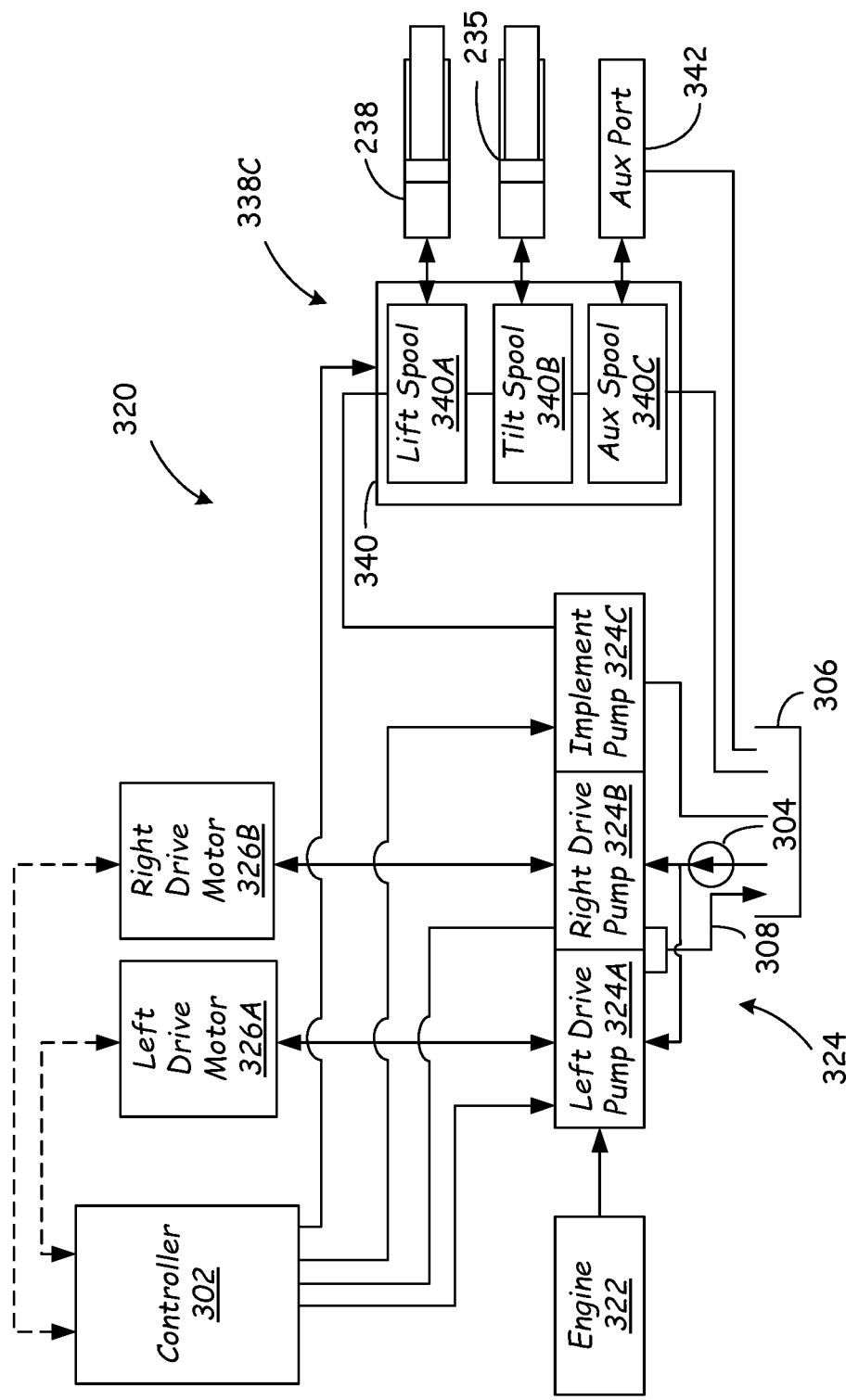
FIG. 5 is a block diagram illustrating the components of the power system of FIG. 4 in greater detail in accordance with an example embodiment.

FIG. 5 is a simplified block diagram of a power system 320 that shows of a representative power system for a power machine generally of the type of power system 220 discussed with reference to FIG. 4. Power system 320 includes a power source 322, which provides power for the power system 320, a power conversion system 324, coupled to the power system to convert the power provided by the power source 322 and selectively provide converted power to work elements on the power machine. A power system controller 302 is in communication with the power conversion system 324. The power system controller 302 provides control signals to components in the power conversion system to direct the provision of converted power to the work elements. The power system controller 302 provides these control signals in response to inputs from various sources such as user input devices 350 or other controllers on the power machine.

Power source 322, corresponding to power source 222 in FIG. 4, is an internal combustion engine such as a diesel engine, although other types of internal combustion engines and power sources can be employed. Examples of other power sources include electric power stores, combinations of power sources, or other types of engines. The type of power supply used does not affect the scope of this discussion, unless stated otherwise or made plainly obvious in the discussion of a specific embodiment. Power conversion system 324 includes a pair of drive pumps, left drive pump 326A and right drive pump 326B in a pump package, and an implement pump 326C. The power source 322 can directly drive the pumps, can indirectly drive the pumps through a belt-driven coupling mechanism, or can drive the pumps using any suitable coupling. Power conversion system 324 can also include a charge pump 304 that pumps hydraulic fluid from tank 306 to provide pressurized hydraulic fluid to drive pumps 326A and 326B to make up for any fluid that may leak out of the drive pump through a case drain and back into tank 306. Charge pumps that perform this type of function are well-known in the art.

The drive system of power system 320 is a hydrostatic system. In various embodiments, each drive pump 326A and 326B can be coupled to one or more motors. In the example shown in FIG. 5, each drive pump is a variable displacement pump coupled to one motor with left drive pump 326A providing hydraulic fluid to left drive motor 328A and right drive pump 328B providing hydraulic fluid to right drive motor 328B. The displacement of each of pumps 326A and 326B is controlled by controls signals from power system controller 302, and the displacement can be controlled in either direction to control forward and rearward movement of the power machine. Drive motors 328A and 328 are two speed motors, meaning that they can be operated at two different displacements, with each displacement being advantageous in certain operational situations. Other drive motors suitable for use on various machines of this type can be constant or infinitely variable displacement motors. FIG. 5 illustrates a dotted line relationship between power system controller 302 and left and right drive motors 328A and 328B. In those machines where the left and right drive motors have multiple, selectable displacements (or in some embodiments, infinitely variable displacements), power system controller 302 is in communication with the left and right drive motors 328A and 328B to control their displacement. Power system 320 is the type of power system that can be found on skid steer loaders such as loader 200. Other types of loaders and power machines can have different features in drive systems, including steerable axles, articulated joints, different drive motor configurations, mechanical transmissions, and so forth.

Implement pump 326C provides a constant displacement of pressurized hydraulic fluid to a control valve 340 of a work actuator circuit 338C, corresponding to work actuator circuit 238C shown in FIG. 4. In other embodiments, the implement pump 326C can be a variable displacement pump, which can be controlled using various techniques to provide only the displacement needed to operate loads that are in hydraulic communication with implement pump 326C. The control valve 340 shown in FIG. 5 is an open center series valve that has three spools: a lift spool 340A that is operable to selectively provide hydraulic fluid to the one or more lift actuators 238; a tilt spool 340B that is operable to selectively provide hydraulic fluid to the one or more tilt actuators 235; and an auxiliary hydraulic spool 340C that is operable to selectively provide hydraulic fluid through an auxiliary port 342 to auxiliary functions such as those of work actuators located on an attached implement. The hydraulic spools have priority in the receipt of the constant supply of hydraulic fluid in the order shown (e.g., the lift spool has priority over the tilt and auxiliary spools, and the tilt spool has priority over the auxiliary spool). A power system controller 302 provides signals to control the positions of the spools of control valve 340, for example, by providing electric signals to control solenoid valve that can facilitate movement of the spools (solenoid valves not shown). Power system controller 302, in some embodiments, is a stand-alone controller that is configured to control only functions related to the power system. In other embodiments, the power system controller 302 can be incorporated into a controller on the power machine that performs other functions. Hydraulic fluid passing through the various spools, and corresponding actuators (e.g., lift actuator(s) 238, tilt actuator(s) 235, etc.) when the spools are energized by power system controller 302, exits the control valve 340 and is returned to tank 306. Control valve 340 is one embodiment of a system to selectively provide hydraulic fluid from implement pump 324C to various actuators. Other embodiments within the scope of this discussion may employ different systems.

The hydraulic circuits between drive pump 326A and drive motor 328A, and between drive pump 326B and drive motor 328B can be closed loop circuits. As mentioned above, there will typically be some leakage of hydraulic fluid in the pumps, and case drain lines (shown collectively as line 308) provide hydraulic fluid leaking from each of the pumps back to tank 306. In some embodiments, this hydraulic fluid leakage can also be provided through a cooler (not shown) before returning to tank 306 for purposes of cooling the hydraulic fluid in the system. Charge pump 304 provides makeup fluid to counteract the hydraulic fluid leakage in the drive pumps. When controlling drive functions of the power machine, power system controller 302 provides electronic signals to stroke the two drive pumps 326A and 326B independently of each other to cause hydraulic fluid to be provided to the hydraulic drive motors 328A and 328B to cause the machine to travel in at a desired speed and in a desired direction.

As noted above, the work performed by a loader can be repetitive in nature, requiring an operator to repetitively manipulate joysticks or other user inputs to accomplish the task each time it is repeated. Repetitive tasks require an operator perform the same task or set of tasks over and over. Depending on the complexity of the tasks or set of tasks, most operators will not be able to perform the task in a highly efficient manner, thereby lengthening the period of time needed to perform a task. In some cases, it may be desirable to have the loader operate repetitive tasks autonomously, i.e., without an operator controlling the loader in real time. Some disclosed embodiments include loaders, and systems used on loaders, configured to augment the control of the loader by semi-autonomously controlling the loader to greatly reduce the necessary involvement of an operator to accomplish the repetitive tasks. Other disclosed embodiments include loaders capable of performing autonomous tasks. In this discussion, the term augmented controls can refer to controls that can perform either autonomous or semi-autonomous tasks, or both. Disclosed embodiments also include kits that can be used to configure or reconfigure existing loaders to implement the disclosed augmented autonomous and/or semi-autonomous control methods and concepts. Disclosed embodiments also include a control system that is capable of learning autonomous and/or semi-autonomous tasks and remembering those tasks so that the tasks can be performed later. In some embodiments, the learning mode includes learning a home position from which an autonomous task is begun.

Figure 6:
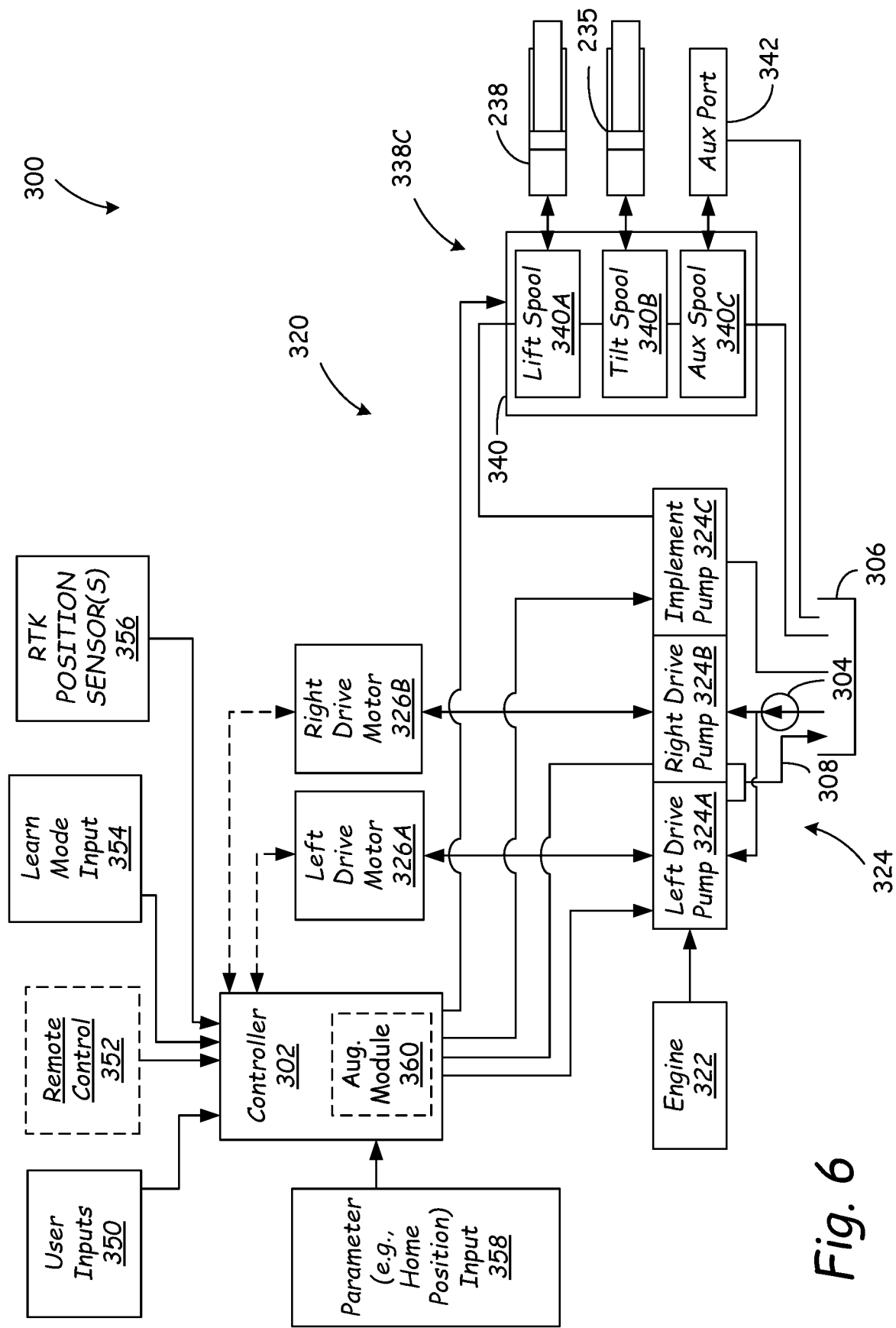
FIG. 6 is a block diagram of a kit for configuring a loader for augmented control.

FIG. 6 is a block diagram illustrating power machine 300 having power system 320 and an augmented control system 420 that is in communication with power system 320 according to one illustrative embodiment. An augmented control system such as augmented control system 420, as will be discussed below, is, in some embodiments, integrated into the power machine 300, while in other embodiments, an augmented control system can be provided as a kit for machines to add augmented control functionality to machines and can be transported from one machine to another. As will be discussed below, augmented control system 420 is in communication with power system controller 302 and augmented control system 420 is configured to provides signals to the power system controller to control actuators that are a part of the power conversion system 324. As discussed above, power system controller 302 is configured to receive signals from various sources to control the power conversion system 324. When an augmented control system 420 is installed on a power machine and in communication with power system controller 302, the augmented control system can be a source or in some conditions, the only source of inputs that the power system controller uses to control the power conversion system. The phrase only source of input in this instance means that the power conversion system is controlled by the augmented control system only and inputs from other sources are not considered.

Figure 7:
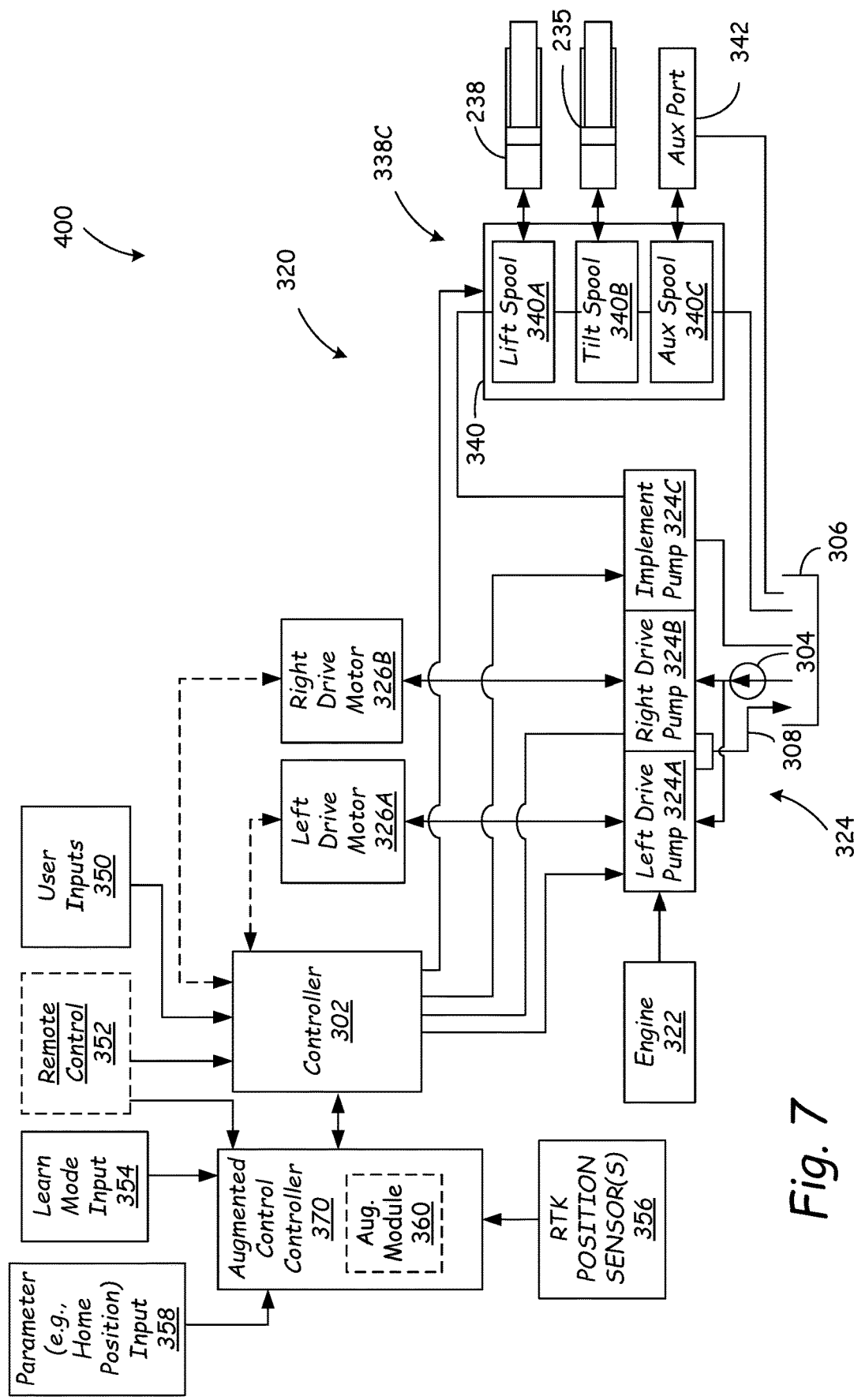
FIGS. 7 and 8 are block diagrams of systems configured to provide augmented control of a loader in accordance with example embodiments.

FIG. 7 shows the augmented control system 420 in more detail. The augmented control system 420 includes an augmented control controller 370, that includes an augmented control module 360 included therein. In FIG. 6, the augmented control system 420 shown is a kit 400 with components which can be added to an existing loader to create system 400. Kit 500 includes components shown in both of FIGS. 6-7, and these components as described are to be understood to correspond to any of system 300, system 400 or kit 500. As shown, kit 500 includes augmented control controller 370, which can be added to an existing loader to implement the augmentation functions of module 360 and to communicate control commands to the existing power system controller 302. In an example embodiment, the augmented control controller 370 is provided by a programmable logic controller (PLC) unit with a display screen and user input capability to allow the operator to input user settings, place the loader in learn mode (described further below) and initiate the task cycle (described further below) as defined by the user. In other embodiments, various other types of controllers, including embedded controllers, can be employed as the augmented control controller 370.

FIGS. 6 and 7 illustrate system 300 and kit 400, respectively, including power system 320 and components configured to provide augmented control in which a home position is set, and a series or collection of machine operations required to perform an iteration of a work task are learned. Subsequently, the loader including system 300 or kit 400 can be commanded to automatically perform the series of recorded operations to repeatedly perform the task as many times as specified to complete a work project. In system 300 shown in FIG. 6, the power system controller 302 is configured with a module 360 that programs the controller to implement the augmented control learning and task execution functions described herein. Module 360 can include hardware (such as a microcontroller and related components) dedicated to perform the augmented tasks and/or instructions to be performed by dedicated hardware in module 360 or by hardware in power system controller 302 that is not dedicated to performing the augmented tasks. While FIG. 6 shows module being contained within power system controller 302, in various embodiments, module 360 can be physically located away from the power system controller 302, even as it is integrated into the loader onto which it is installed. In other words, the system 300 is integrated into the loader and is not normally removable or transportable from loader to another. By contrast, FIG. 7 illustrates a kit 400 shown in FIG. 7, including a separate augmented control controller 370 that is capable of being added to a previously manufactured loader, and configured with the module 360, to convert existing loaders into loaders capable of implementing the augmented control concepts disclosed herein. In system 400, augmented control controller 370 communicates with the power system controller 302 to implement the augmented control functions.

While user inputs 350 (e.g., joystick controls, touchscreen displays, etc.) of the loader can be used, a remote-control device 352 can optionally be included to allow control of the loader by an operator not seated in the operator compartment of the machine. In some exemplary embodiments, in addition to controlling normal loader functions which duplicate the options available to an operator sitting in the operator compartment, including starting or stopping the loader, the remote control device 352 can be used to initiate the learn mode, set a home position, initiate augmented control of the loader to repetitively perform a learned task cycle, input other augmented control parameters such as waypoints and geofence boundaries, or control other augmented control functions.

Also, optionally provided are a learn mode input 354 and a parameter input 358. The learn mode input 354 can be a switch, push button or other input device that, when actuated by the operator, initiates a learning mode where the various operations of the loader are recorded, for example including recording travel direction, travel speed, loader position, lift arm movement, implement carrier movement, and/or auxiliary functions. Learn mode input 354 can be included with remote control 352, included with augmented controller 370 for example as an input on a touch screen, or otherwise implemented with existing input devices. As such, learn mode input 354 need not be a separate input device in some embodiments. Similarly, a parameter input 358 can be included and configured to allow the operator to input augmented control parameters such as the home position, a number of times a learned task is to be repeated, waypoints, boundaries, etc. Similarly, parameter input 358 can be implemented as a portion of remote control 352, included with augmented controller 370, or otherwise implemented with existing input devices.

Also included with kit 500 are real-time-kinematic (RTK) sensors 356 that provide position and movement information during the learning mode. RTK sensors can include machine position sensor(s) 370 that indicate a position of the loader, lift arm position sensor(s) 372 that indicate a position or orientation of the lift arm relative to a reference such as the frame of the loader or the ground, and implement carrier position sensor(s) 374 that indicate a position or orientation of the implement carrier and any attached implement relative to a reference such as the lift arm or the ground. Examples of RTK position sensors that can be used to determine position and movement when the operator places the system into learn mode include RTK global positioning system (GPS) sensors, inertial measurement unit (IMU) inclinometers, ultrasonic sensors, low power radar, and radio frequency (RF) distance measuring devices.

In exemplary embodiments, the RTK position sensors are configured to be placed at specific positions on a loader, with the positions indexed to pre-existing features on the frame, lift arm, implement carrier, etc. This controls the positioning of the sensors but does not require alterations to the loader that could impact structural performance or integrity of the loader.

Figure 8:
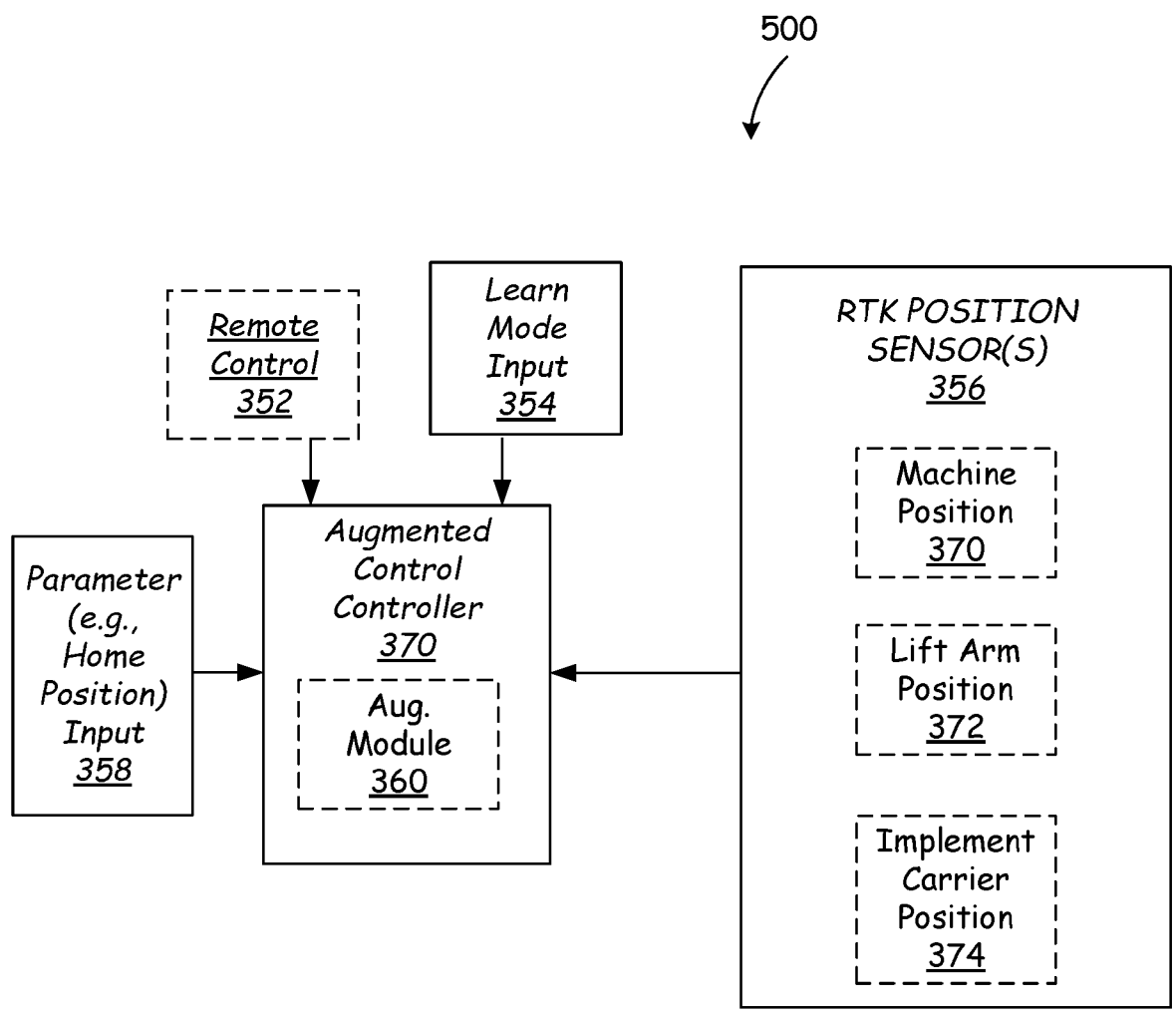

While example embodiments are described with reference to FIGS. 6-8, other embodiments include additional functionality and features. For example, in some embodiments, the disclosed systems have the ability to upload waypoints, boundaries, and/or drive, lift and tilt functionality from an external source instead of having a user input these parameters or having the functionality recorded during a learning mode. Also, in some embodiments, the disclosed systems include geofence shutdown capability, where the controllers are configured to disable the loader if it leaves a designated working area. Further, in some embodiments, the disclosed systems will shut down the loader if the machine leaves a user defined window or zone of operation from the learned task. For example, if the loader is performing a material transport task and the user defines a +/−X feet of operation zone and the loader travels beyond this tolerance, the loader can be automatically shut down by the controller.

Figure 9:
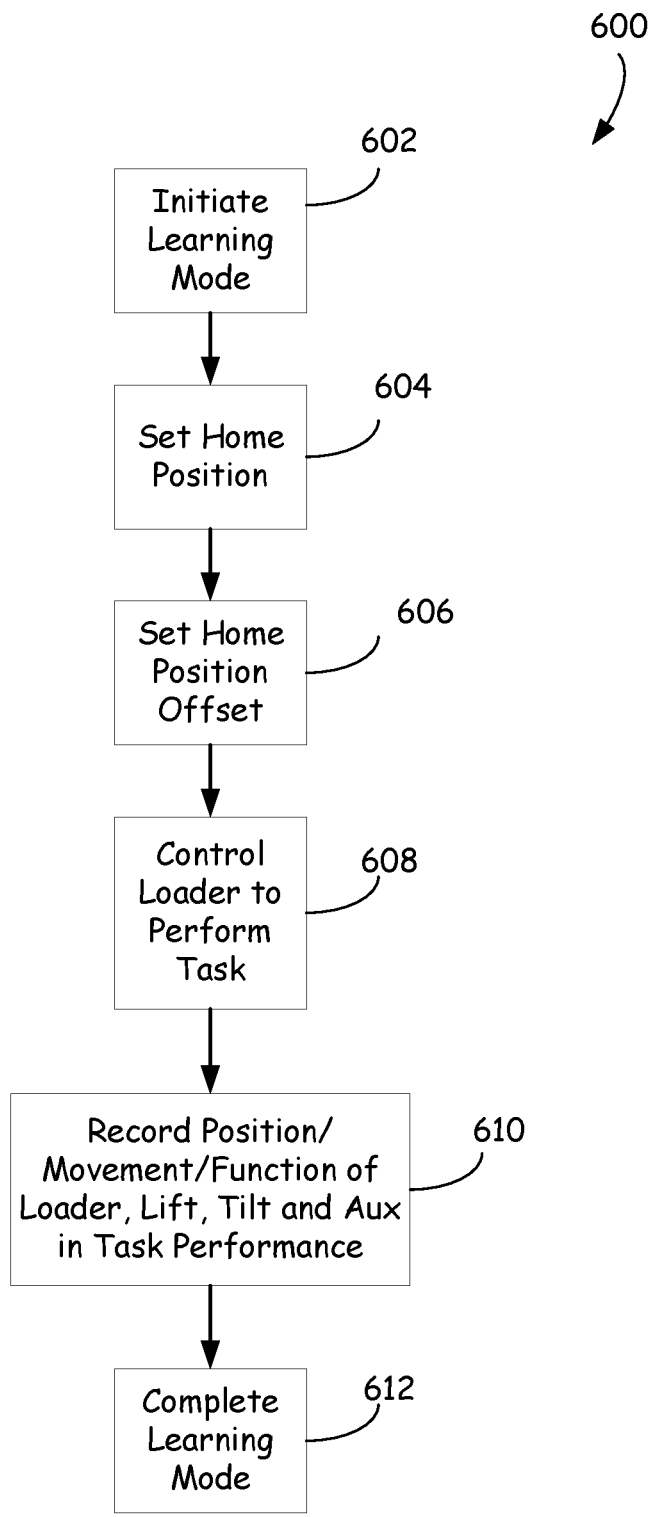
FIG. 9 is a flow diagram illustrating a method of learning a task for augmented control of a loader.

Referring now to FIG. 9, shown is a flow diagram illustrating a method 600 of learning a task for augmented control of a loader using systems 300 or 400. As shown in block 602, the operator initiates the learning mode using learning mode input 354, and as shown at block 604 a home position for the loader is set using parameter input 358. Frequently, the home position will be the current position of the loader as determined using the RTK position sensors at the start of the learning mode, but this need not be the case in all embodiments. At block 608, the loader is controlled by the operator to perform an iteration of the task to be learned, and at block 610, the positions, movements and/or functions of the loader in performing the task are recorded or stored in memory associated with the controller. As discussed, the loader can be controlled using the operator controls/inputs in the operator compartment, or by using a remote control. The recording can include the operator inputs required to control the loader and/or the positions and movements of the loader, lift arm (or lift cylinders) and implement carrier (or tilt cylinders) as indicated by RTK sensors 356. When the operator inputs, or the positions and movements of the loader, lift arm and implement carrier necessary to complete a task cycle have been recorded, the learning mode can be terminated as shown at block 612.

Figure 10:
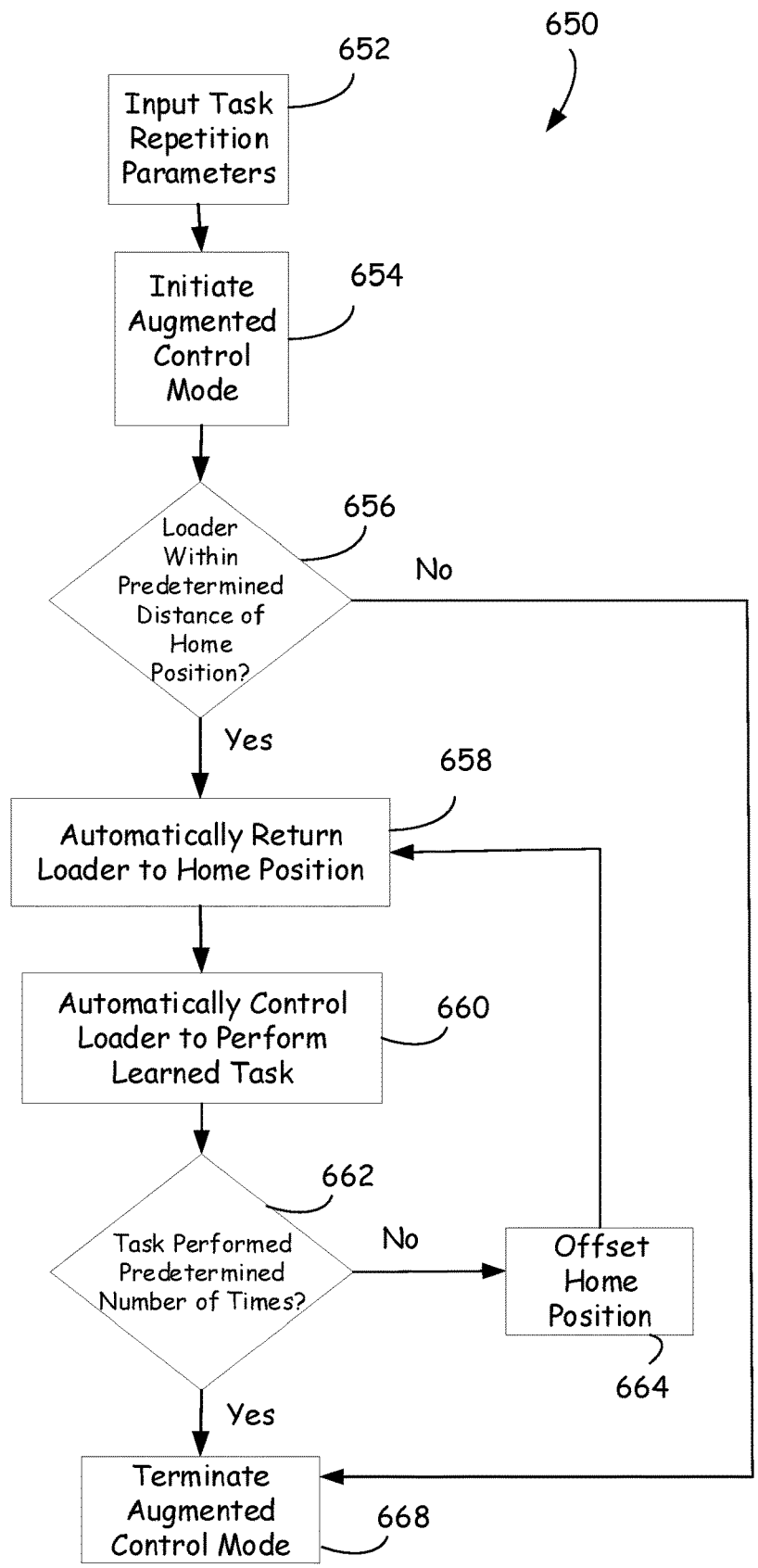
FIG. 10 is a flow diagram illustrating a method of controlling a loader to perform a learned task to provide augmented control of a loader.

Referring now to FIG. 10, shown is a flow diagram illustrating a method 650 of controlling a loader to perform a learned task cycle to provide augmented control of a loader. In the method, at block 652, a task repetition parameter is input by the operator (e.g., using input 358) to indicate a number of times that the recorded task cycle should be repeated during the augmented control operations of the loader. The learned task cycle can be repeated once, twice, or as many times as the user selects. In other embodiments, the task repetition parameter can be something other than a number of iterations for the task cycle to be repeated. For example, with a home position offset, the task repetition parameter can be a position of the loader at which the augmented control operation is to be automatically terminated. In still other embodiments, the task repetition parameter can be a boundary position at which the augmented control is to be automatically terminated.

As shown at block 654, the augmented control mode in initiated by the operator. After initiation of the augmented control mode, a determination is made at decision 656 as to whether the loader is within a predetermined distance of the specified home position. The specified distance can be a permanent value for the loader or can be a parameter previously input by the operator in some embodiments. In one exemplary embodiment, the predetermined distance is user definable but not to exceed 50 feet, with a default value of 10 feet. If the loader is determined to be further than the predetermined distance from the home position, the augmented control mode is terminated at block 668. However, if the loader is determined to be within the predetermined distance from the home position, at block 658 the loader automatically returns to the home position to start the augmented control task cycle.

After returning to the home position, at block 660 the loader is controlled automatically or semi-automatically to perform the travel, lift, tilt and/or auxiliary functions recorded during the learning mode to complete a task cycle. In some embodiments, an operator can operate the loader and transition from a hands-on normal mode of operation to a hands-off task cycle mode of operation and back again to the hands-on mode to allow the operator to utilize augmented control to perform repetitive or desired motions of the loader on demand.

Once a task cycle has been completed, a determination is made at decision 662 as to whether the task has been performed a predetermined number of times established when inputting the task repetition parameters as shown at block 652. If the task has been performed the predetermined number of times, the augmented control mode is terminated at block 668. Otherwise, any specified home position offset is used to adjust the home position as shown at block 664, and the process continues with the loader returning to the new home position as shown at block 658.

The learn mode can be used to teach an entire work cycle to a loader so that the loader can repeat the work cycle one or more times. Alternatively or in addition, the learn mode can be used to learn a particular task that is going to be performed repeatedly by an operator. For example, an operator may be performing a task such as augering post holes for a fence. An operator may put the loader into learn mode to learn how to operate an implement (i.e., a post hole auger) to dig a hole to a proper depth. Once, the operation is learned, the operator can position the loader and initiate the learned operation to dig a hole, move the loader to another position and again initiate the operation. This sort of augmented, semi-autonomous operation is another example of the learn mode.

Figure 11:
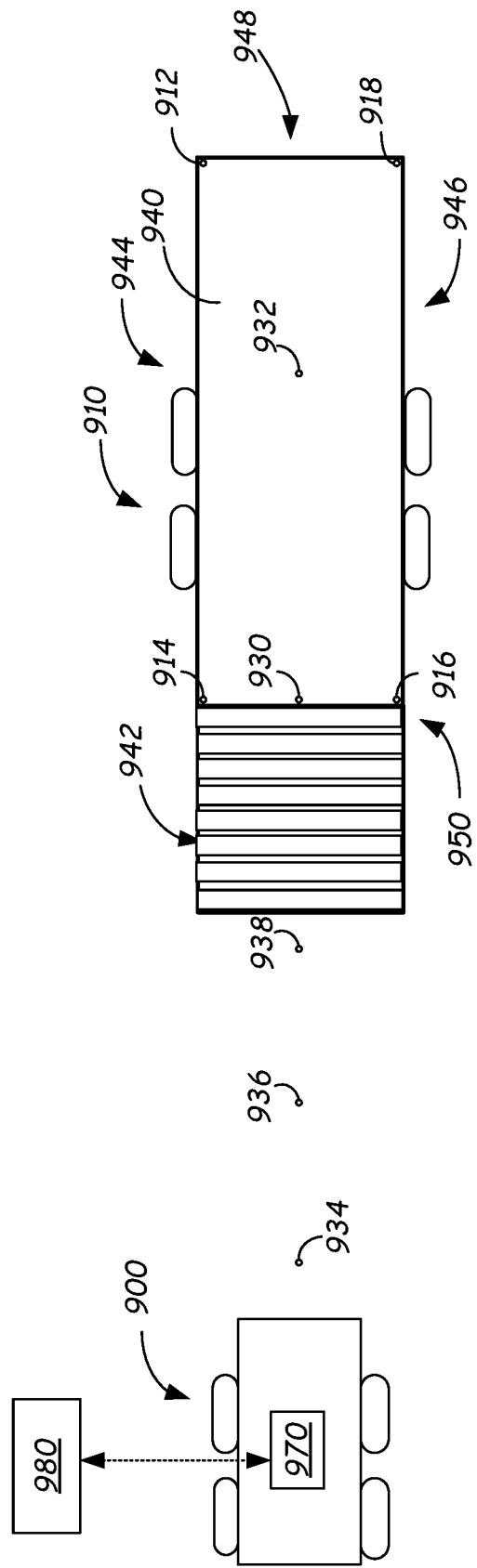
FIG. 11 is a diagram illustrating a loader in position to be driven onto a ramp.
Figure 12:
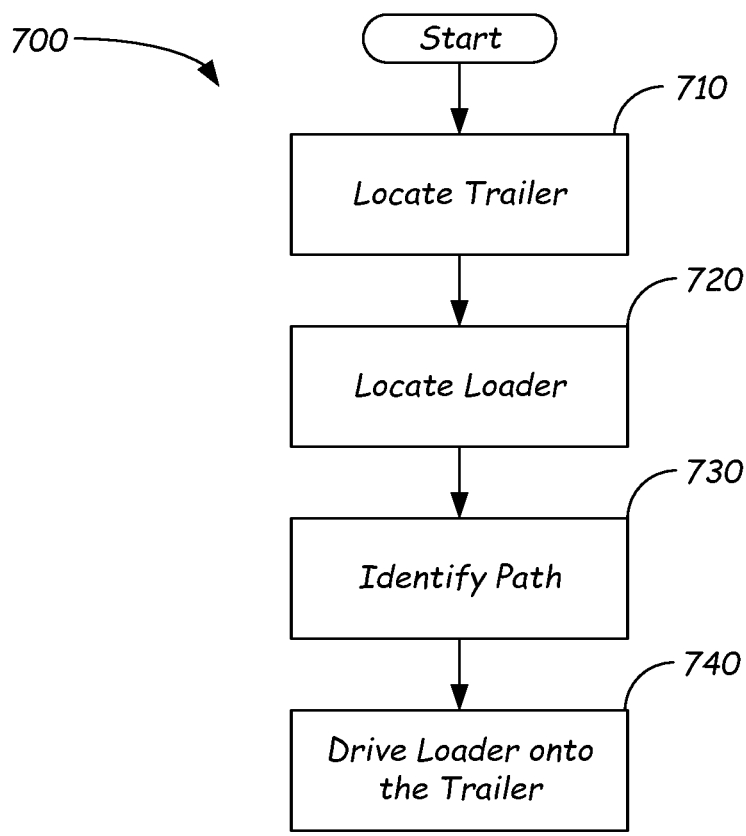
FIG. 12 is a flow diagram illustrating a method of controlling a loader to drive the loader on a trailer according to one illustrative embodiment.

FIG. 11 is a diagram illustrating a loader in position to be driven onto a ramp. FIG. 12 is a flowchart that illustrates a method 700 of driving a loader onto a trailer according to one illustrative embodiment and Loader 900 is a loader of the type discussed above with an augmented control controller 970 configured to provide augmented control including some or all of the features discussed above. A portable controller 980 is capable of communicating with augmented control controller 970. Portable controller 980, in some illustrative embodiments, is a smart phone configured with one or more software applications to engage the augmented controller 970 to facilitate the method 700 of driving the loader onto a trailer. The illustration of the loader 900 and the trailer 910 are provided for reference during the discussion of method 700. The loaders are often moved to and from jobsites by pulling them while they are located on a trailer. Loading a loader onto a trailer can be a difficult task for an inexperienced operator.

Figure 13:
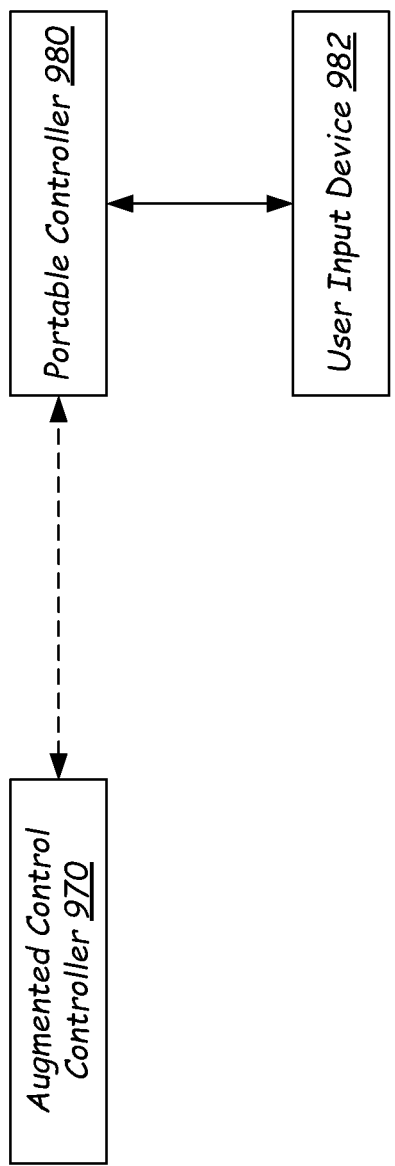
FIG. 13 is a block diagram illustrating a configuration between a portable controller and a user input device that is in communication with the portable controller.

The method 700 details how a loader can be loaded onto a trailer without requiring an operator to be controlling the loader. Referring to the flowchart of FIG. 12, at block 710, the method includes locating the trailer 710. In one embodiment, the trailer is located by identifying four corners of a flatbed portion 940 of the trailer. The flatbed portion 940 of the trailer is where the loader 900 is intended to be positioned. For the purposes of this discussion, the trailer 910 has a left side 944, a right side 946, a front end 948, and a rear end 950. In addition to the flatbed portion 940, a trailer of this type typically has a hitch (not shown) to couple to the trailer to a vehicle (also not shown) that can pull the trailer. The trailer 910 also includes a ramp 942, which is shown in a down position in FIG. 13, but is movable to a raised position when the trailer is being moved. The loader 900 will use the ramp to move up onto or down off the flatbed 940.

Returning again to block 710, in one embodiment, the trailer is located by identifying the four corners of the flatbed portion 940. This can be accomplished by using the portable device 980 to pin the corners. For example, the portable device 980 can be positioned over a corner of the trailer and actuated to identify a corner of the flatbed portion 940 of the trailer. In one embodiment, the four corners are identified in a specific order, with a left front corner 912 being identified first, followed by a left rear corner 914, a right rear corner 916, and a right front corner 918. These points are collected and assigned a GPS location (i.e., they are "pinned") by the portable device 980. It is generally understood that the GPS function on such portable devices are not necessarily accurate enough to identify the exact position of the trailer, but by interfacing with the augmented control controller 970, a correction can be made. This is discussed in more detail below. Once these four points are collected, they are checked by the portable controller 980 to determine that they have been measured to describe a rectangle. This is determined by calculating the diagonal lengths from the left front corner 912 to the right rear corner 916 and from the right front corner 918 and the left rear corner 914. If these two diagonal lengths are sufficiently close in length (i.e. within an acceptable tolerance), the trailer is considered to be properly identified and located. If the two diagonal lengths are not considered to be sufficiently close in length, the trailer has not been determined to be properly measured and the trailer will have to be re-measured by reidentifying the four corners again. This checking of the shape of the collected points can be performed before a correction is made to the collected points or after, depending on the embodiment.

While in some embodiments, the pinning process is performed by aiming the phone at the corners generally, in other embodiments, each corner can have an identifiable mark that the pinning device (e.g., the smart phone) can recognize. As the pinning device recognizes each identifiable mark, each corner is more accurately measured. Once it is determined that the trailer has been accurately pinned, the portable controller 980 can determine the heading of the trailer by the direction of a line that runs through the left front corner 912 and a left rear corner 914. The portable controller 980 can then also calculate a centerline of the trailer by finding a mid-point 930 of a line that extends between the left rear corner 914 and the right rear corner 916. The mid-point 930 is also located at the rear of the flatbed 940. In addition, the length and width of the flatbed 940 are calculated and once, these dimensions are calculated and the type of machine to be placed on the trailer is determined, the portable controller 980 can determine whether the trailer is of adequate size to accept the loader 900. This information can then be communicated to the augmented control controller 970.

At block 720, the method locates the loader. The loader 900 is located by pinning the loader by using the portable controller 980 to pin the loader at a specific spot on the loader. This could be any location, and in some embodiments, it is an identifiable mark at a known position on the loader. The augmented control controller 970, in some embodiments, is configured to have information related to the overall dimensions of the loader 900 and the location of the identifiable mark on the loader. While block 720 is shown as being sequentially after the block 710 in the flowchart of FIG. 12, in other embodiments, the loader can be located simultaneously with or prior to locating the trailer. Once the trailer is located and a GPS location is established, the loader 900 (i.e., the augmented control controller 970) will provide an RTK position to the portable controller 980 for the loader 900, which will provide an error correction factor for the GPS location. More specifically, the RTK position is compared against the GPS position for the machine and an error correction factor is calculated based on the difference between the two measurements. This error correction factor can be applied to the pinned locations on the trailer as well. This will provide a more accurate identification of the trailer's location.

Once the loader 900 and the trailer 910 are located, at block 730 a path for the loader to travel onto the trailer is identified. In one embodiment, the method of identifying the path includes identifying a point 932 on the trailer 910 that represents the final place on the path, i.e., where the loader 900 will be when the method 700 is completed. Point 932 is centered between the left side 944 and the right side 946 of the trailer 910 and located at a position between the front end 948 and the rear end 950 to properly position the loader 900 on the trailer. For example, the point 932 can be selected to center the loader 900 over axles or sufficiently forward from the rear end 950 of the trailer 910. Additional points 934, 936, and 938 off and behind the trailer 910 and on a line that extends through points 930 and 940 provide a path to follow to move the loader onto the trailer.

Once the path is identified, at block 740, the method includes driving the loader onto the trailer. The process includes moving the loader to the first point 934 so that the loader is aligned with the trailer. The loader 900 is then backed onto the trailer by moving the loader to the point 936, and then to point 938, and then to point 930. Moving from point 938 to point 930, the loader will back up the ramp 942. Finally, the loader moves to point 932 and the loader is positioned on the trailer. Driving the loader onto the trailer, in some embodiments, is initiated by a command from the portable controller 980. After the command is initiated (i.e., in response to a user input), the portable controller 980 can provide the user with a user input, that, when pressed or otherwise engaged (e.g. by a voice command), will command the augmented control controller 970 to stop the driving of the loader onto the trailer.

The portable controller 980 is also capable of interfacing with the augmented control controller 970 or other controllers on the loader 900 to operate as a remote-control device to control the loader directly in response to commands provided by a user. The portable controller 980 can be configured to provide buttons, sliders and the like on a screen that an operator can interface to control functions on the loader 900 to control functions such as driving the loader, raising and lowering the lift arm, and the like. Alternatively, the portable controller 980 can interface with an input device 982 shown in FIG. 13 that has user input devices such as buttons, toggles, and joysticks that can be used to provide user input signals for controlling such functions of the loader. The interface can be via a wired connection or a wireless connection such as Bluetooth or other wireless communication protocol. Such a configuration can be used to drive the loader off of the trailer.

Figure 14:
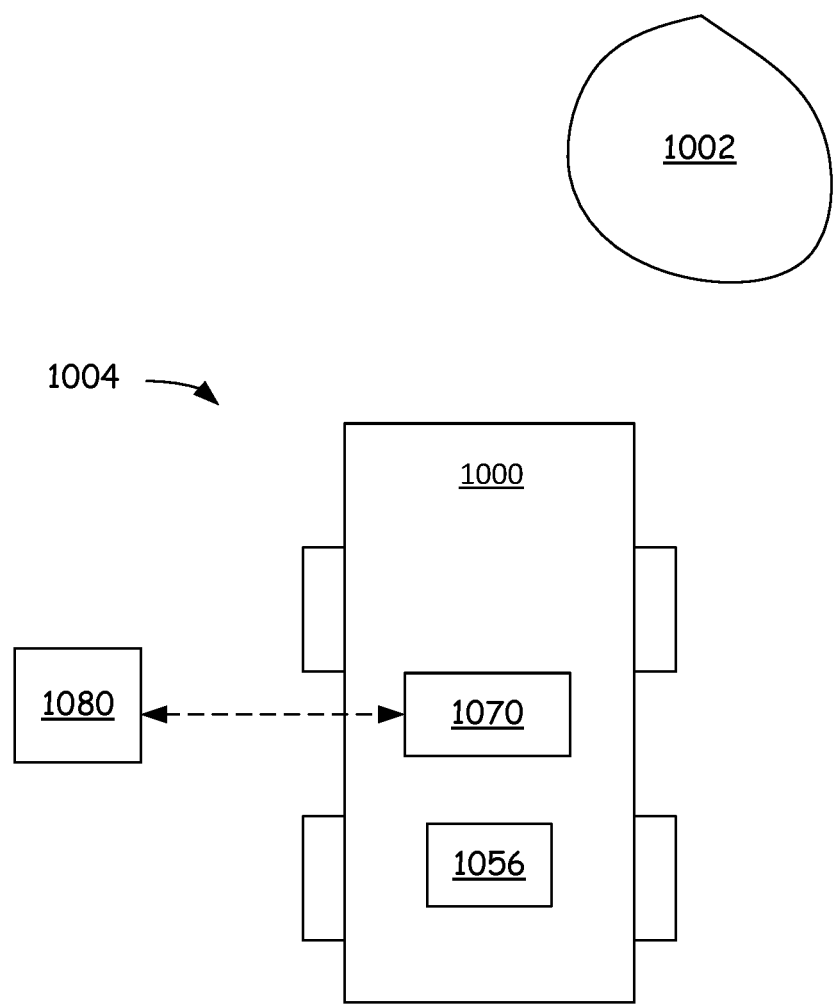
FIG. 14 is a diagram illustrating a system including a loader having augmented control features to control the loader to avoid contact with an obstacle.
Figure 15A:
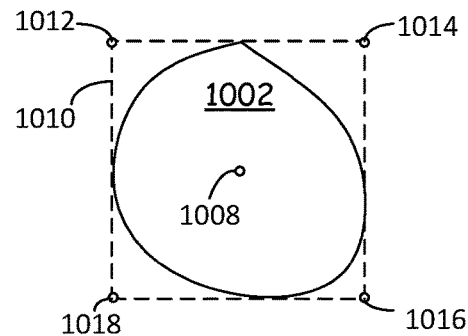
FIGS. 15A-15D illustrate examples of various mapped obstruction zones for an obstacle.
Figure 15B:
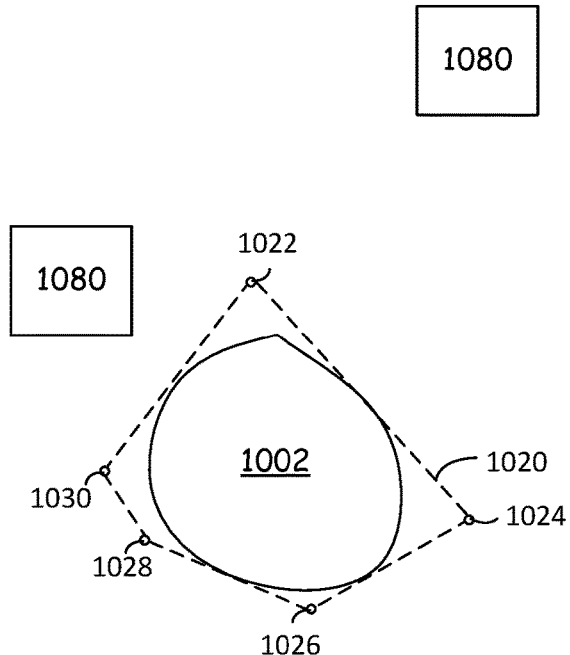
Figure 15C:
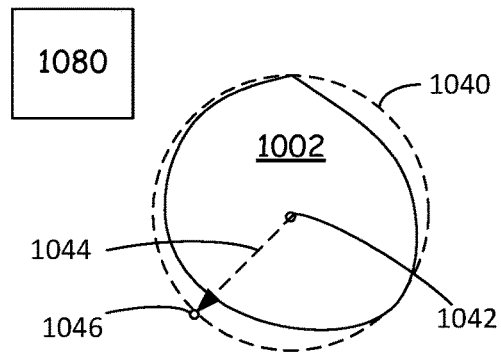
Figure 15D:
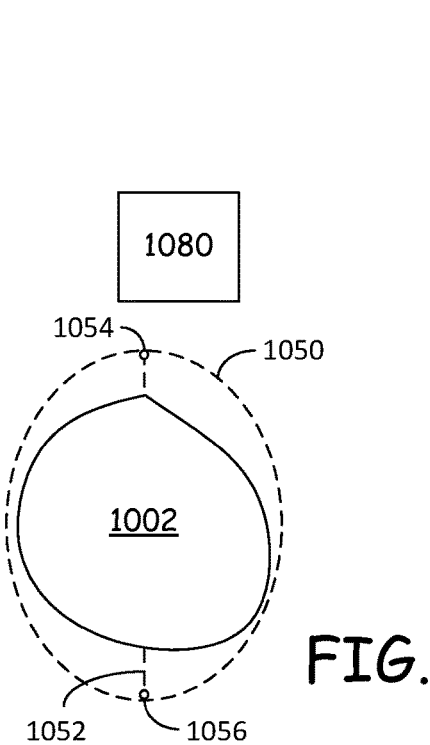
Figure 16:
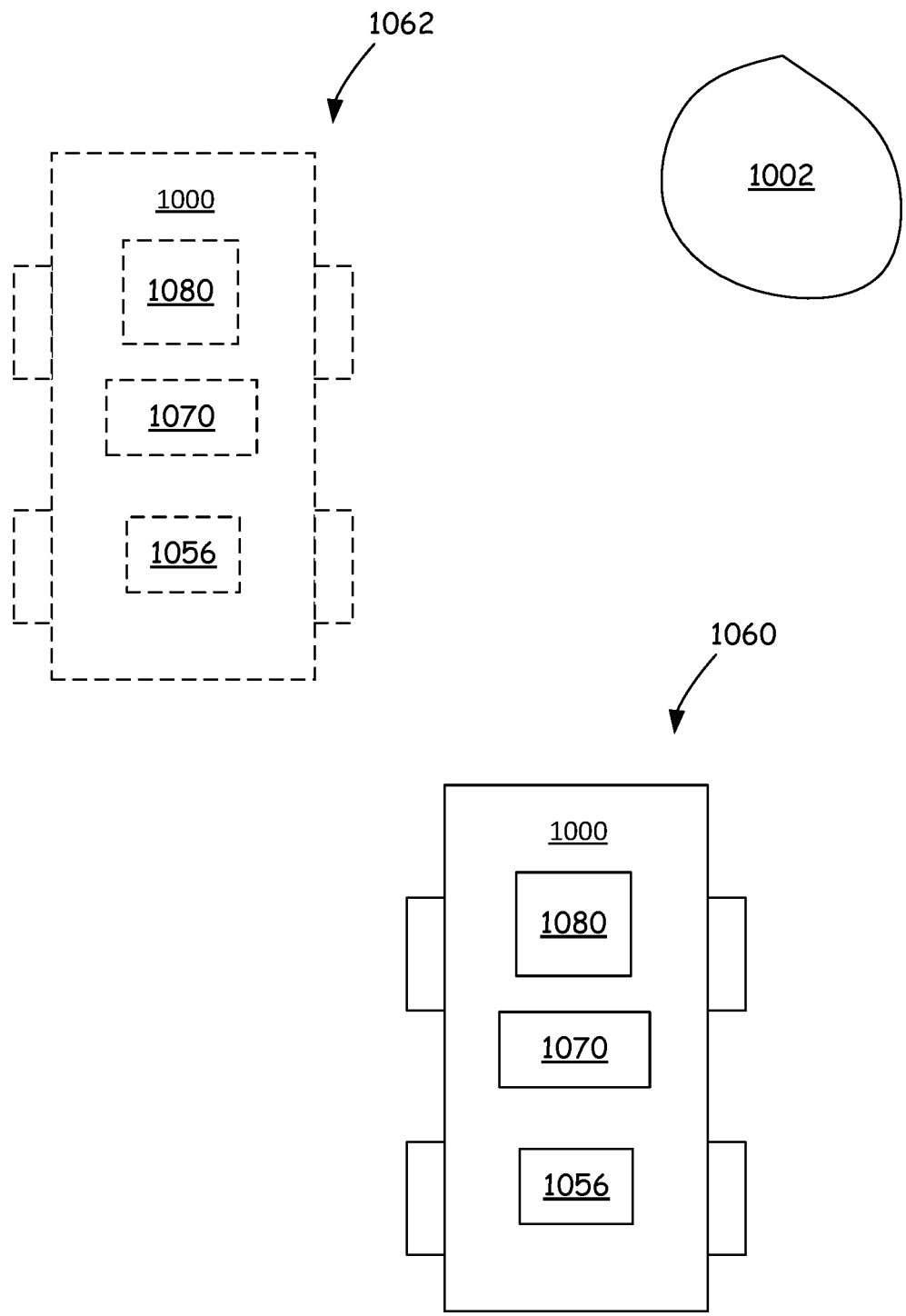
FIG. 16 illustrates a feature of identifying a position of the loader in a manner which allows an error correction factor to be determined.
Figure 17:
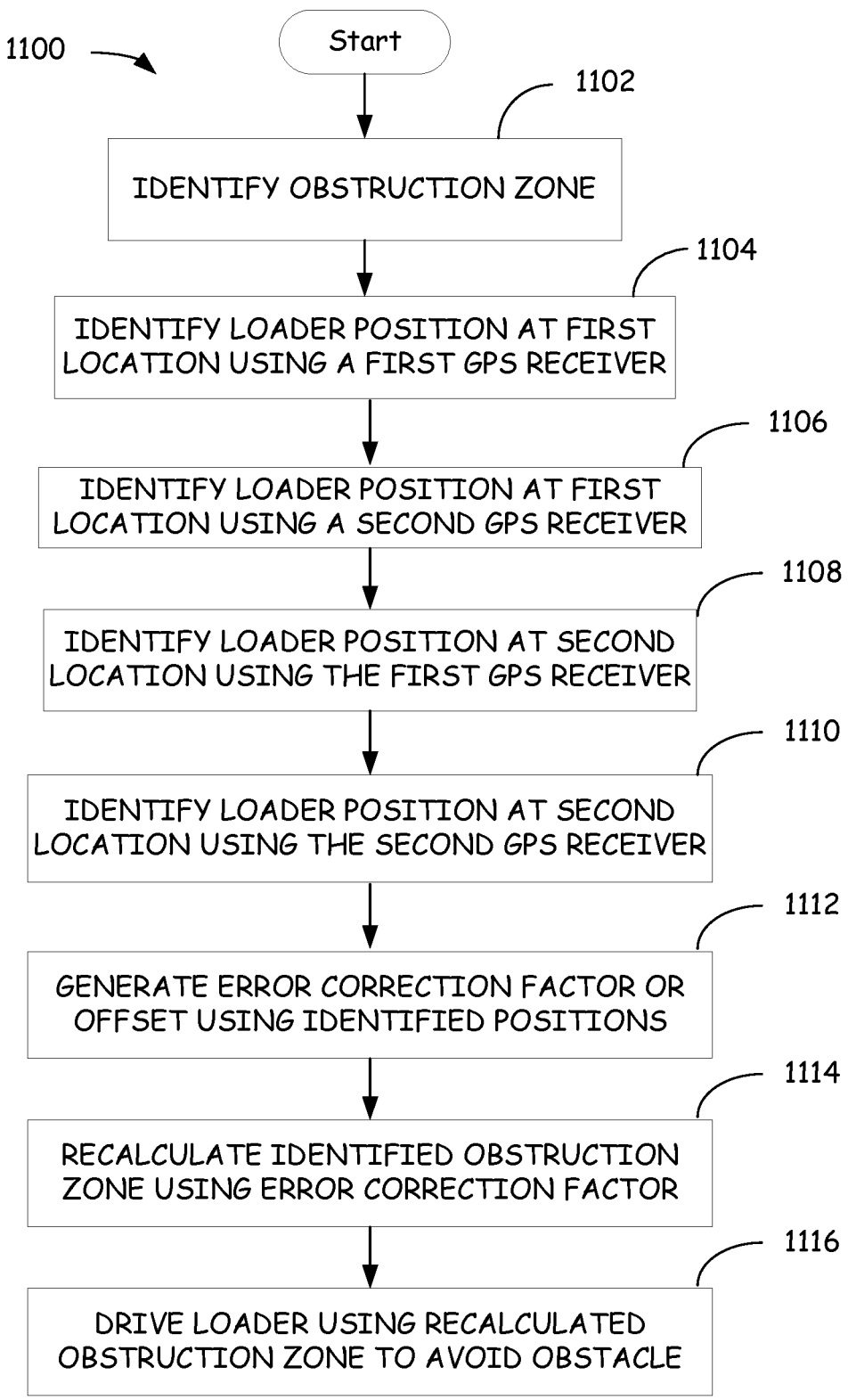
FIG. 17 is a flow diagram illustrating a method of mapping an obstruction zone and operating a loader to avoid contact with obstacle.

FIG. 14 is a diagram illustrating a system 1004 including a loader 1000 having an augmented control controller 1070 configured to control the loader to avoid contact with an obstacle 1002. System 1004 also includes a portable controller 1080, with each of the portable controller 1080 and the loader 1000 having separate GPS receivers or receiver circuitry and software. FIGS. 15A-15D illustrate examples of various mapped obstruction zones for obstacle 1002 which can be created using the portable controller 1080 having a GPS receiver. FIG. 16 illustrates a feature of identifying a position of the loader in a manner which allows an error correction factor to be determined and used in adjusting the location mapped obstruction zones. FIG. 17 is a flowchart that illustrates a method 1100 of mapping the obstruction zones and operating loader 1000 to avoid contact with obstacle 1002.

Loader 1000 is a loader of the types discussed above with an augmented control controller 1070 configured to provide augmented control including some or all of the features discussed above. Loader 1000 includes a GPS receiver 1056 which is configured to identify positions of the loader within a workspace. Although shown as separate elements in FIG. 14, in some embodiments, the GPS receiver 1056 can be contained within augmented controller 1070. The GPS receiver of the portable controller 1080 can be a less precise GPS receiver providing lower position accuracy than the GPS receiver 1056 of loader 1000. The portable controller 1080 is also configured to communicate with augmented control controller 1070. Portable controller 1080, in some illustrative embodiments, is a smart phone having a processor and memory configured with one or more software applications to engage the augmented controller 1070 to facilitate the method 1100 of operating the loader to avoid contact with the obstacle 1002. As such, while configuration features of the augmented control controller and related features of FIGS. 14-16 are similar to the above discussed features that define where a loader should travel, the presently discussed embodiments further relate to defining obstacles or obstructions in a work site, and thereby defining where the loader should not travel. The illustration of the loader 1000, the portable controller 1080, and the obstacle 1002 are provided for reference during the discussion of method 1100.

The method 1100 shown in FIG. 17 details how an object or obstruction 1002 in a work space can be identified and then how a loader, or other types of equipment, can be prevented from operating in the position of the obstruction. As will be discussed, obstruction zones surrounding or defining the obstruction location can be assigned on a work space map which is used by the augmented control controller 1070 to prevent operation of the loader in the obstruction zones to prevent contact with the obstruction 1002. The obstruction zones can be defined on the work space map, temporarily or more permanently, such that the same work can be performed repeatedly without identifying the same obstruction over and over.

At block 1102, method 1100 includes identifying an obstruction zone for the obstruction 1002. To identify an obstruction zone, the user can use the GPS receiver of portable controller 1080 to tag the obstruction 1002. This locating process can be accomplished by, in various examples, identifying a point, a line or a series of line segments or defining a perimeter of the object using the portable controller. As discussed above, the location of the obstruction can be defined by positioning the portable controller 1080 to identify one or more GPS points with the software application on that device. The portable controller can further be configured to define an obstruction zone by adding an area around the defined point, line segment(s), or perimeter. For example, referring to FIG. 15A, the defined area of the obstruction zone can be a rectangle (which includes a square) centered around a defined point 1008 or with the defined point at any location within the rectangle. Alternatively, the obstruction zone can be defined by a perimeter 1010 established by GPS points 1012, 1014, 1016 and 1018 around the obstruction 1002. As shown in FIG. 15B, the perimeter need not be rectangular in shape in all embodiments. In FIG. 15B, perimeter 1020 of a polygon shaped obstruction zone around obstruction 1002 is established using a series of line segments between GPS points 1022, 1024, 1026, 1028 and 1030. Alternatively, the defined obstruction zone area can be a circle defined around a point as shown in FIG. 15C where perimeter 1040 of the obstruction zone is defined by a center GPS point 1042 and a radius 1044. The radius can be input by a user, or determined by the portable controller 1080 from a second measured GPS point 1046. Further, in some embodiments, an obstruction zone shape, such as a rectangle or an oval, can be defined around a line segment. For example, as shown in FIG. 15D, a line segment 1052 can be defined between two measured GPS points 1054 and 1056 near the obstruction 1002, and the obstruction zone perimeter can be automatically defined from a shape (in this case an oval) around the line segment.

At block 1104, method 1100 includes identifying a loader position at a first location using a first GPS receiver. The first GPS receiver can be the GPS receiver in portable controller 1080 placed at a particular position on loader 1000. FIG. 16 illustrates loader 1000 at a first location 1060 with the portable controller 1080 positioned to identify the loader location. When obtaining the GPS loader position with the first GPS receiver (i.e., with portable controller 1080), it is important to measure the loader position of a known spot on the loader. For example, such a spot may be where the antenna for the loader GPS receiver 1056 is located. Alternatively, there may be a pre-defined position on the loader that the application software on the portable controller 1080 can identify and the distance between that mark and the antenna of the loader GPS 1056 will be a known stored parameter. In addition, it is advantageous to know the particular type of loader 1000, and also what type of attachment is mounted on the loader, because this information can be used to identify the total footprint of the loader/attachment relative to the GPS position that is taken. This information is useful when attempting to avoid an obstruction, while allowing the loader to operate as close as possible to the obstruction. Referring again to FIG. 17, at block 1106 the method includes identifying the loader position at the first location 1060 using a second GPS receiver. In this instance, the second GPS receiver can be the loader GPS 1056.

At block 1108, the method includes identifying the loader position at a second location using the first GPS receiver. As shown in FIG. 16, this can include moving the loader to second location 1062 in the work area and measuring the GPS position of the loader using portable controller 1080. Once again, the portable controller should be positioned at the same known spot on the loader as discussed above. It is important that the position of the portable controller on the loader be as close as possible to the previously used position. Using an indexed or marked position on the loader helps to ensure this. At block 1110, the method includes identifying the loader position at the second location 1062 using the second GPS receiver, in this example using the loader GPS 1056.

Comparing the results from the first and second GPS receivers at each of the two loader positions allows an error correction factor or offset to be calculated or generated, as shown at block 1112. The error correction factor can be calculated based on the difference between the two measurements at each location. For example, the error correction factor can be an average of the difference between the two measurements at the two loader locations. The error correction factor or offset is then used to recalculate or correct the previously identified position of the obstruction 1002 or obstruction zone, as shown at block 1114, providing much more accurate position identification than the first GPS receiver provides alone. As shown at block 1116, the loader is then driven using the recalculated position of the obstruction or obstruction zone to avoid contact with the obstacle. This can include autonomous or augmented control of the loader 1000, by augmented control controller 1070, to steer the loader away from contact with the obstacle 1002, to stop travel of the loader if the travel path approaches the obstruction zone, to provide warnings to an operator if the loader approaches the obstacle, and/or by other augmented control actions as discussed above. Generally, once the obstruction zone or area is defined, the loader will not be allowed to enter the obstruction zone, whether the loader is being operated by an on-board operator, by a remote operator, or by a preprogrammed routine (e.g., autonomously).

Figure 18:
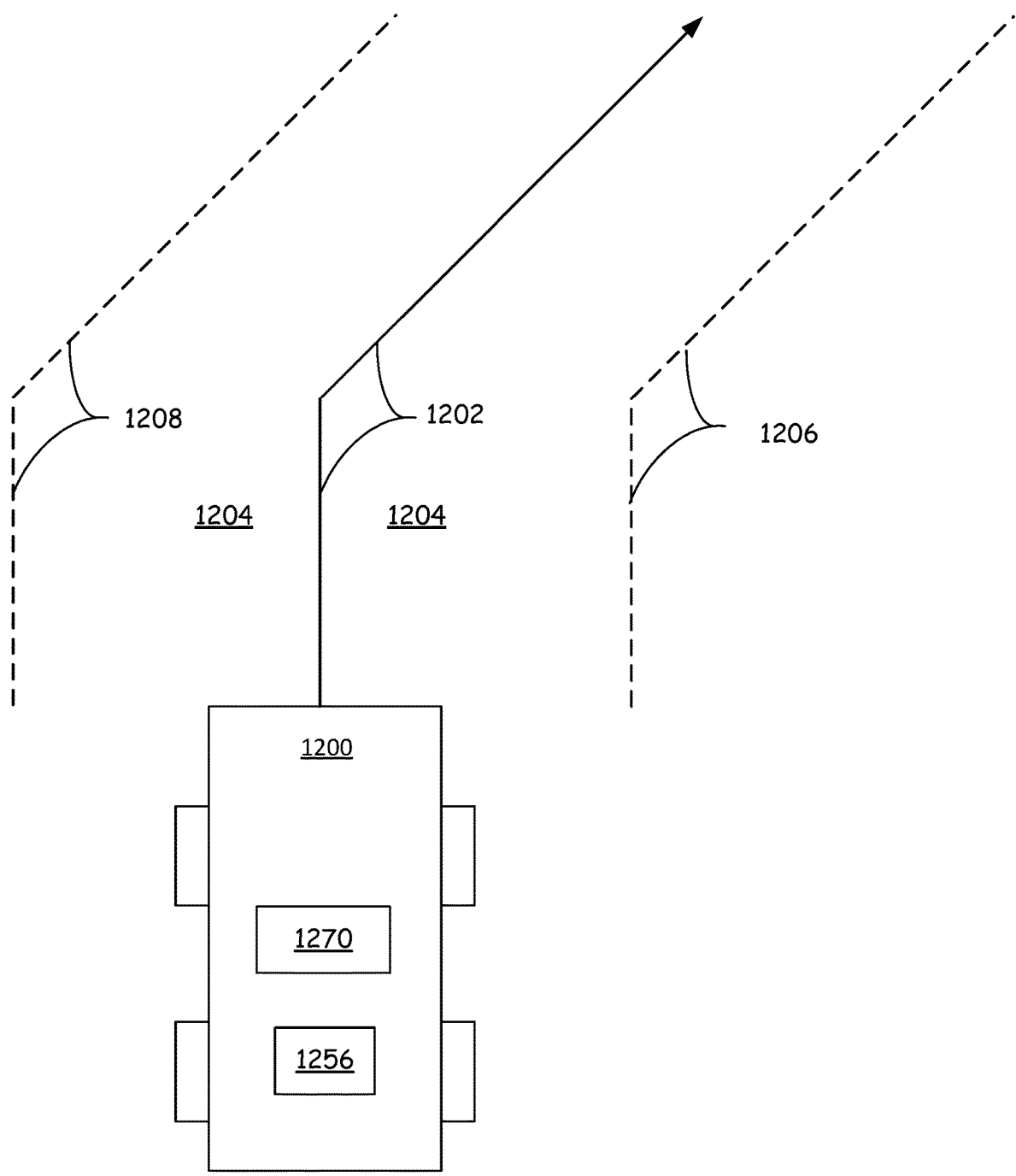
FIG. 18 is a diagram illustrating a dynamic fencing feature of some disclosed embodiments.

Referring now to FIG. 18, shown is a loader 1200 having a GPS receiver or other RTK position sensors 1256 and an augmented control controller 1270 (as discussed above, the GPS receiver or other RTK position sensors 1256 can be integral to controller 1270). Loader 1200 is a loader of the types discussed above with the augmented control controller 1270 configured to provide augmented control including some or all of the features discussed above. Further, augmented control controller 1270 is configured to control the loader 1200 using a disclosed dynamic fencing feature when the loader is traveling along a pre-defined or pre-programmed path 1202. Using this dynamic fencing feature, the loader control causes the loader to travel directly along the path 1202 with minimal deviation. Rather than create a large window of allowed operation areas, as the concept of geo-fencing is generally understood to be, disclosed dynamic fencing features create a window around the path. In FIG. 18, this window 1204 of allowed operation of the loader is defined by path offset boundaries 1206 and 1208. In this example, path offset boundaries 1206 and 1208 run parallel to defined path 1202. However, this need not be the case in all embodiments and other techniques may be used for defining the boundaries of the window 1204 of allowed operation around the defined path. If the loader should deviate from the defined path 1202 and travel outside of the window 1204, a deviation event would be identified and the loader 1000 can be shut down.

Figure 19:
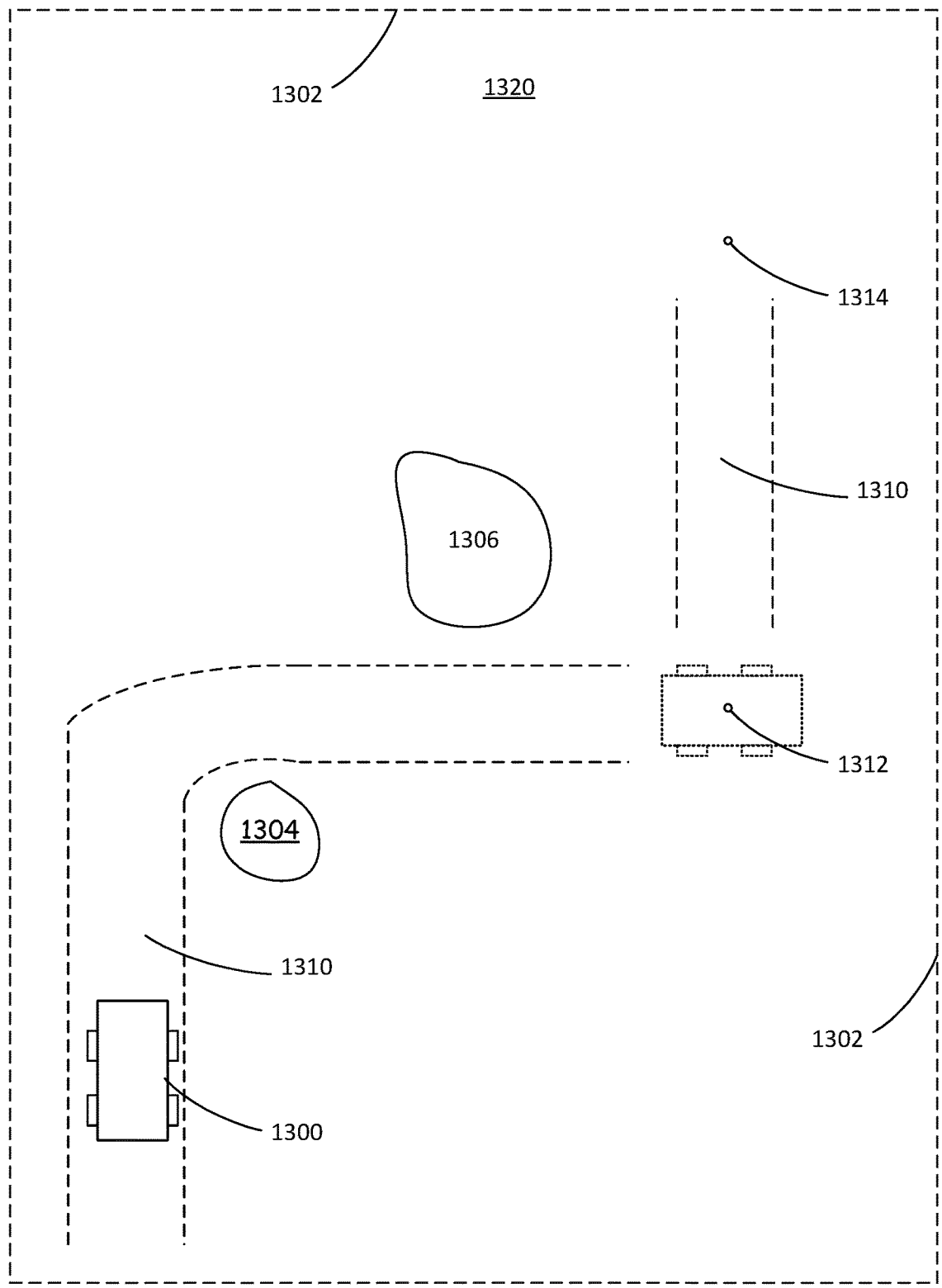
FIG. 19 is a diagram illustrating a mapping of a worksite having a predefined virtual roads feature of some disclosed embodiments.

The disclosed techniques and features can be used to map a worksite. A visual representation of a mapped worksite 1320 is represented in FIG. 19. A loader 1300 having some or all of the above discussed features is also illustrated, though a representation of the loader need not be included on any maps in some embodiments. A worksite 1320 as shown in FIG. 19 can be described by manually surveying the site, including a boundary 1302 and any obstructions 1304 and 1306. Once the worksite is surveyed, with the boundaries and obstructions converted to longitude and latitude information, the information is stored in a computer readable file which is then downloaded by the software application on the portable controller. A portable controller is not illustrated in FIG. 19, but can be any of the portable/mobile controllers discussed above (e.g., 980, 1080). The computer readable file can then be communicated to the loader augmented control controller and permanently stored there for use at any point in the future. Because the loader has a high precision GPS receiver, the loader augmented control controller will be capable of navigating the worksite without needing any other input from the mobile controller. However, if there are additional obstructions to be marked, they can be marked by the portable controller, communicated to the GPS receiver and augmented control controller on the loader, and calibrated using the process described above. If the portable controller also has a high precision GPS receiver (for example, it could also be using RTK), the information gathered by the software application on the portable controller can be provided directly to the loader controller without the need to calibrate the information.

While the mapping method can generate an outer boundary 1302 of the worksite 1320, it can also be used to generate areas within the worksite where a machine can operate freely. In other words, the mapping method can generate virtual roads 1310 on which the loader can navigate freely while performing a task. This allows the operator to send a command via the portable controller to move to a particular point (e.g., point 1312) and the loader will then follow predefined virtual roads 1310 to move to that spot without requiring a completely redefined path. This can be further extended to allow for the loader to have a plurality of pre-defined locations (e.g., points 1312 and 1314) that it is supposed to move to and the loader can move to the first location 1312 following virtual roads 1310, and then at the command of the operator or, after a period of time, the machine can then move to the second location 1314, and so on.

Figure 20:
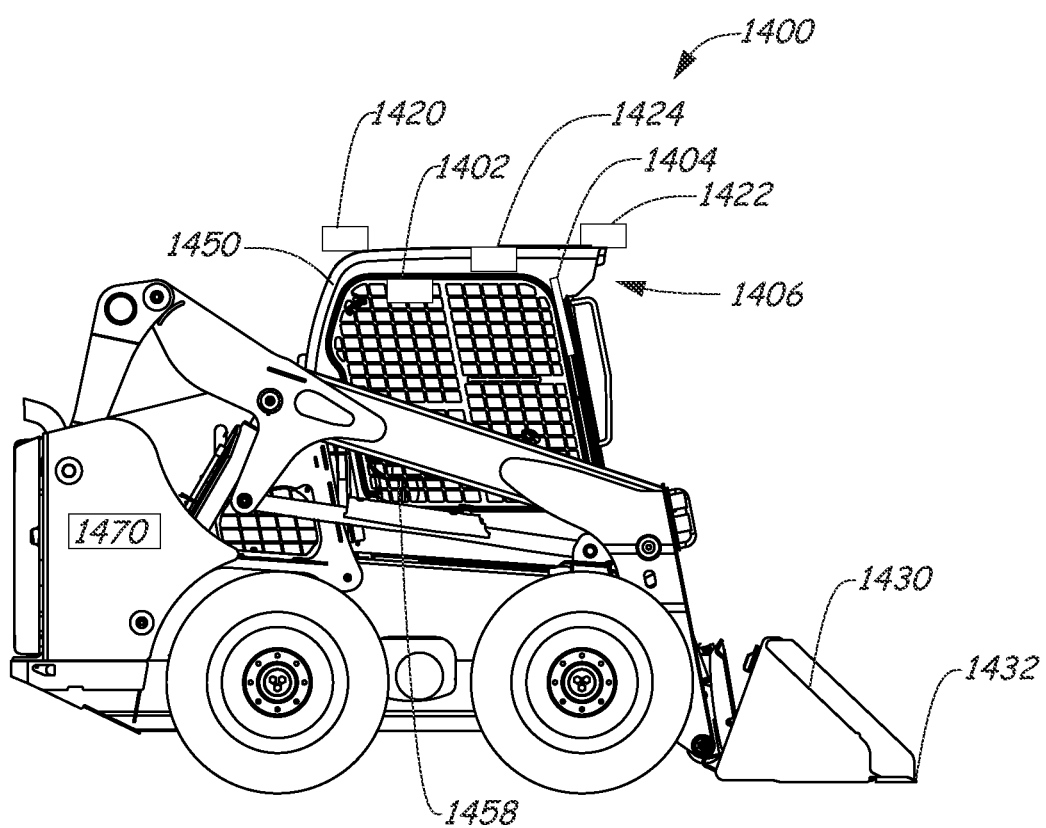
FIG. 20 is a diagrammatic side view of a loader configured with an augmented control system and a heads-up display system.
Figure 21:
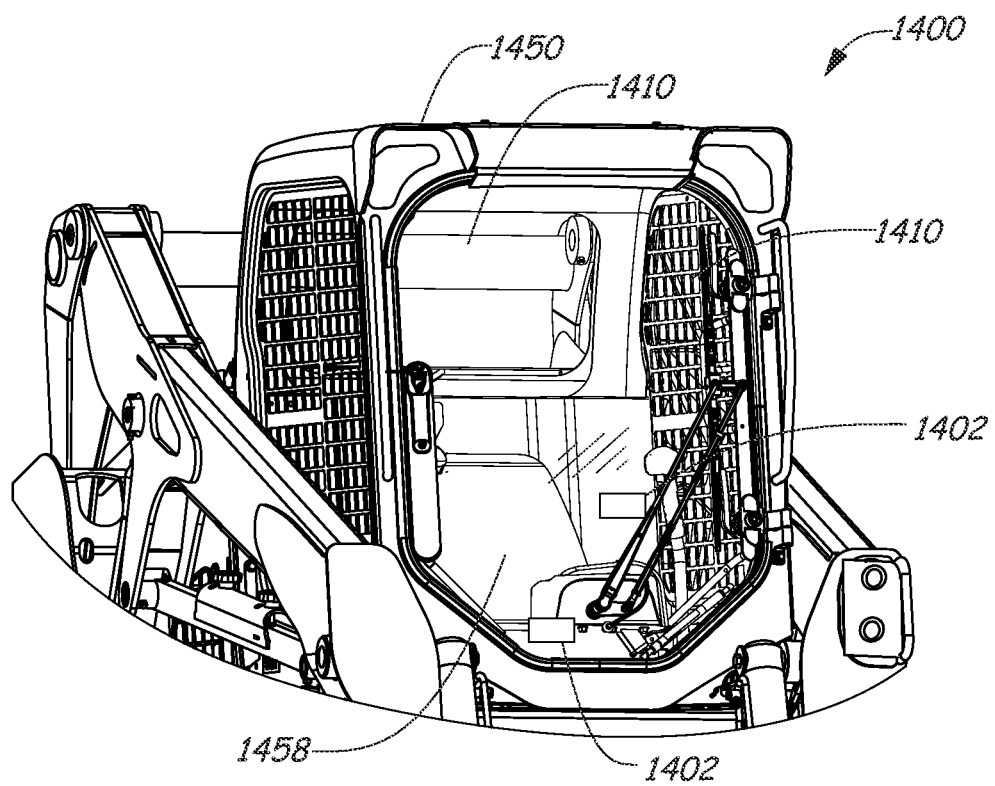
FIG. 21 is a perspective view of a cab having a transparent door that can be used as a heads-up display projection surface in one exemplary embodiment.
Figure 22:
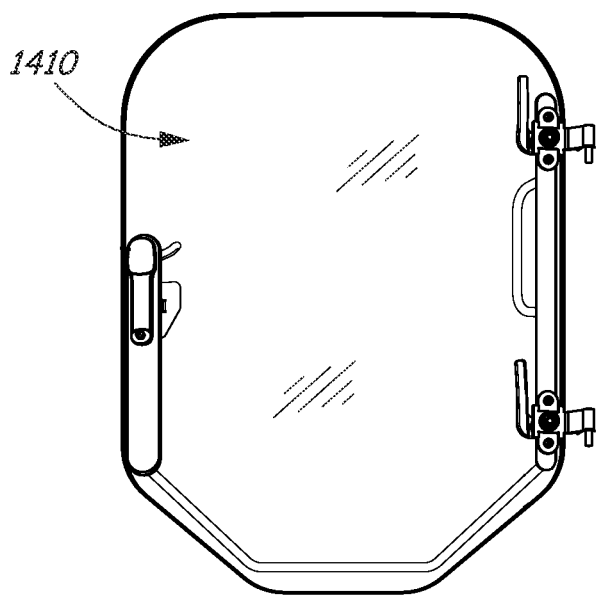
FIG. 22 is a front view of a door similar to the door shown in FIG. 21.

Referring now to FIGS. 20-22, shown is a loader 1400 in accordance with an exemplary embodiment. Loader 1400 can be similar to the above-discussed loaders and power machines and can have some or all of the above discussed features. As such, loader 1400 includes an augmented control controller 1470 configured to implement various augmented control features as discussed above. In disclosed embodiments, loader 1400 also includes a projection device 1402 positioned within cab 1450 and configured to display images, video and/or other information on a transparent material 1404 positioned in front of the operator in the cab. In exemplary embodiments, projection device 1402 and transparent material 1404 are portions of a heads-up display (HUD) system 1406 utilized by loader 1400 to display information. The heads-up display system 1406 can be under the control of, or receive information from, augmented controller 1470.

In some exemplary embodiments, the transparent material 1404 is glass or glass-like material (e.g., plexiglass) positioned in front of the operator of the loader when seated within the cab 1450. The material 1404 can also be a tinted transparent material. In some embodiments, the transparent material can be a display material dedicated for use only as a projection screen. In other embodiments, the transparent material 1404 can be a portion of material serving other functions within the cab. For example, in some embodiments, transparent material 1404 used to display images and information projected by device 1402 can be the glass or glass-like material of a front cab door. Referring now to FIGS. 21 and 22, shown are a front perspective view of cab 1450 and a front view of a door 1410 coupled to cab frame 1414 of cab 1450, respectively to control ingress and egress through an opening 1416 in the cab. In some exemplary embodiments, the glass or glass-like transparent material of door 1410, which can have a concave inner surface 1412, provides the transparent material 1404 shown diagrammatically in FIG. 20.

Projection device 1402 shown in FIG. 20 can be any suitably configured projection device of the type utilized to provide heads-up display systems. As such, projection device 1402 can be mounted within cab 1450 in any suitable location which allows the projection of images and information onto transparent material 1404 without interfering with the operator of the loader. For example, projection device can be positioned above and behind the operator seat 1458 in some embodiments. However, in other exemplary embodiments, the rear projection device 1402 can be positioned below or to side of operator seat 1458 as shown in FIG. 21. Also, in some embodiments, projection device 1402 can be located outside of cab 1450 but configured to project augmented reality images, content or video into the cab for display on transparent material 1404. In exemplary embodiments, the projection device 1402 is configured to project images, content and/or video using either laser projection or holographic projection techniques and can include projecting image areas viewed by the operator as 3D images appearing outside the cab 1450 and transparent material 1404.

As discussed, heads-up display system 1406 can be used to display various augmented information as disclosed above. For example, the system 1406 can be configured to display a live camera feed from any of a rear view (back-up) camera 1420, a front view or cutting-edge camera 1422, and a side view camera 1424. These camera feeds can provide a view of the rear of the loader when backing up, a view of the area to the sides of the loader during operation, and/or an extended or enhanced view of the work area in front of the loader. In some embodiments, a front view camera 1422 can be positioned to provide an enhanced view of the work tool or implement attached to the loader, such as a view of a cutting edge 1432 of a bucket implement 1430 in one example.

In addition, in some embodiments, heads-up display system 1406 can be configured to display representations of identified above-ground obstacles (e.g., obstacle 1002 discussed above), obstructions (e.g., 1304 and 1306 discussed above) or underground objects such as utilities, pipes, buried objects, etc. These obstacles can have been marked via hand-held device (such as a smart-phone or tablet) and imported into the augmented controller 1470 or into a separate controller configure to control the heads-up display system. Further, heads-up display system 1406 can be configured to display other worksite or jobsite features (e.g., defined paths 1202, virtual roads 1310, boundaries 1302) marked via handheld device or imported via landscaping or jobsite mapping programs or applications as part of the disclosed augmented control systems.

Referring now to FIGS. 23-1, 23-2, 24-1, and 24-2, shown are portions of a loader 1500 in accordance with another exemplary embodiment. Loader 1500 can be similar to the above-discussed loaders and power machines and can have some or all of the above discussed features. As such, loader 1500 can include any of the above-described augmented control controllers configured to implement various augmented control features as discussed above. Loader 1500 includes a door 1510 that removably covers a front aperture, allowing ingress into and egress out of the cab, with an integrated display panel 1530 having display material 1532 positioned to display information in front of an operator. Like door 1410, door 1510 includes a concave inner surface 1502 through which the operator can view a work area outside of the cab. The display panel 1530 of door 1510 is positioned such that the information is more within the operator's line of sight of the work area than is the case with conventional display panels mounted in upper or lower corners of the cab. This reduces the necessity for the operator to look away from the work area while operating the machine. Instead, the integrated display panel allows the operator to observe displayed information while continuing to look generally toward the work area. Displaying the information generally in the operator's line of sight to the work area, as can be the case with a heads-up display embodiment, provides advantages in that the operator can maintain better situational awareness since it is not necessary to look downward or away from the work area. Integrated display panel 530, however, provides further advantages relative to a heads-up display. For example, in exemplary embodiments, the integrated display panel includes a touch screen allowing the operator to control the display of information, enter data, or otherwise interact with the display. Also, integrated display panel 530 can be brighter than a rear-projection heads-up display, allowing the displayed information to be more easily seen by the operator, even in extremely bright ambient conditions.

Figures 1, 23:
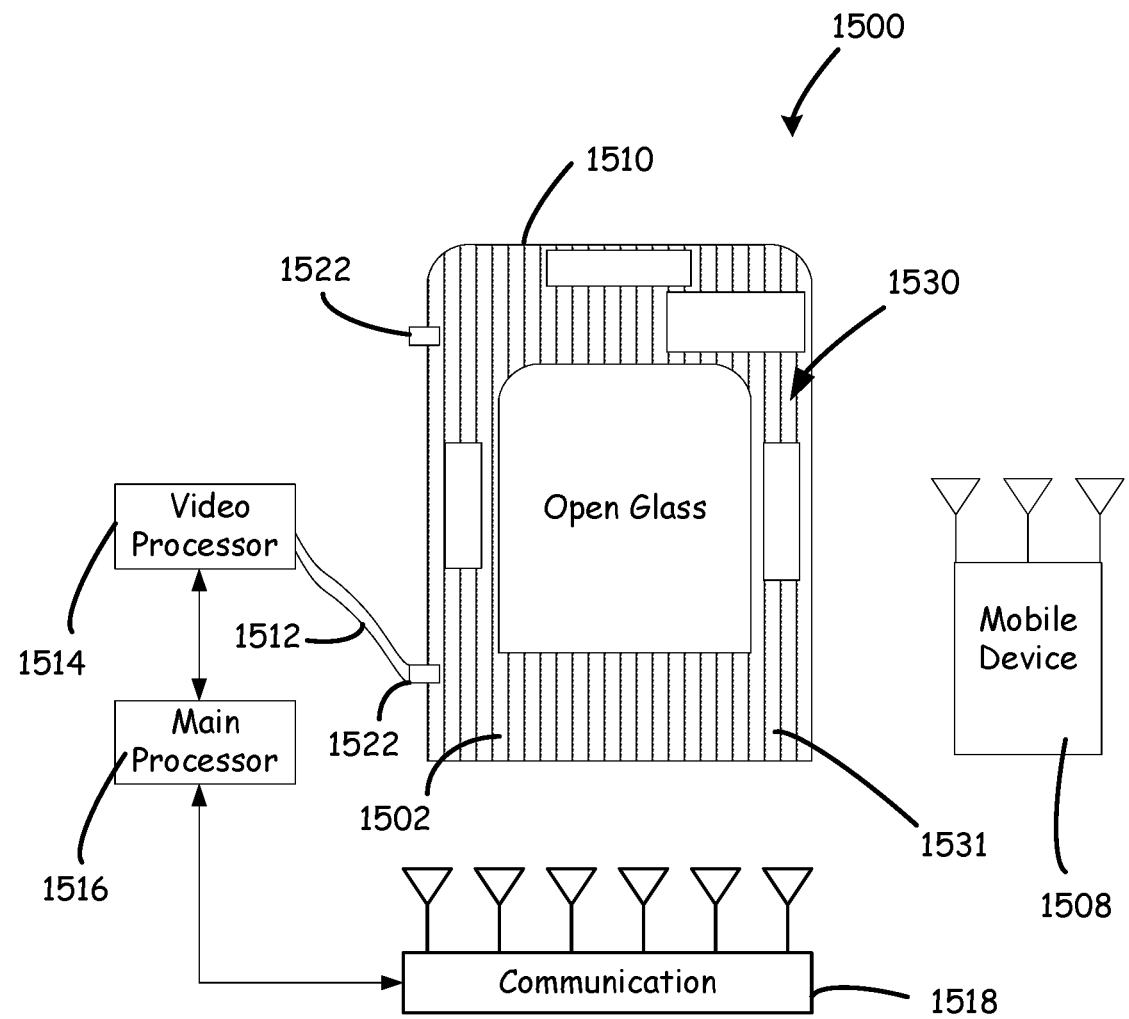
Figures 2, 23:
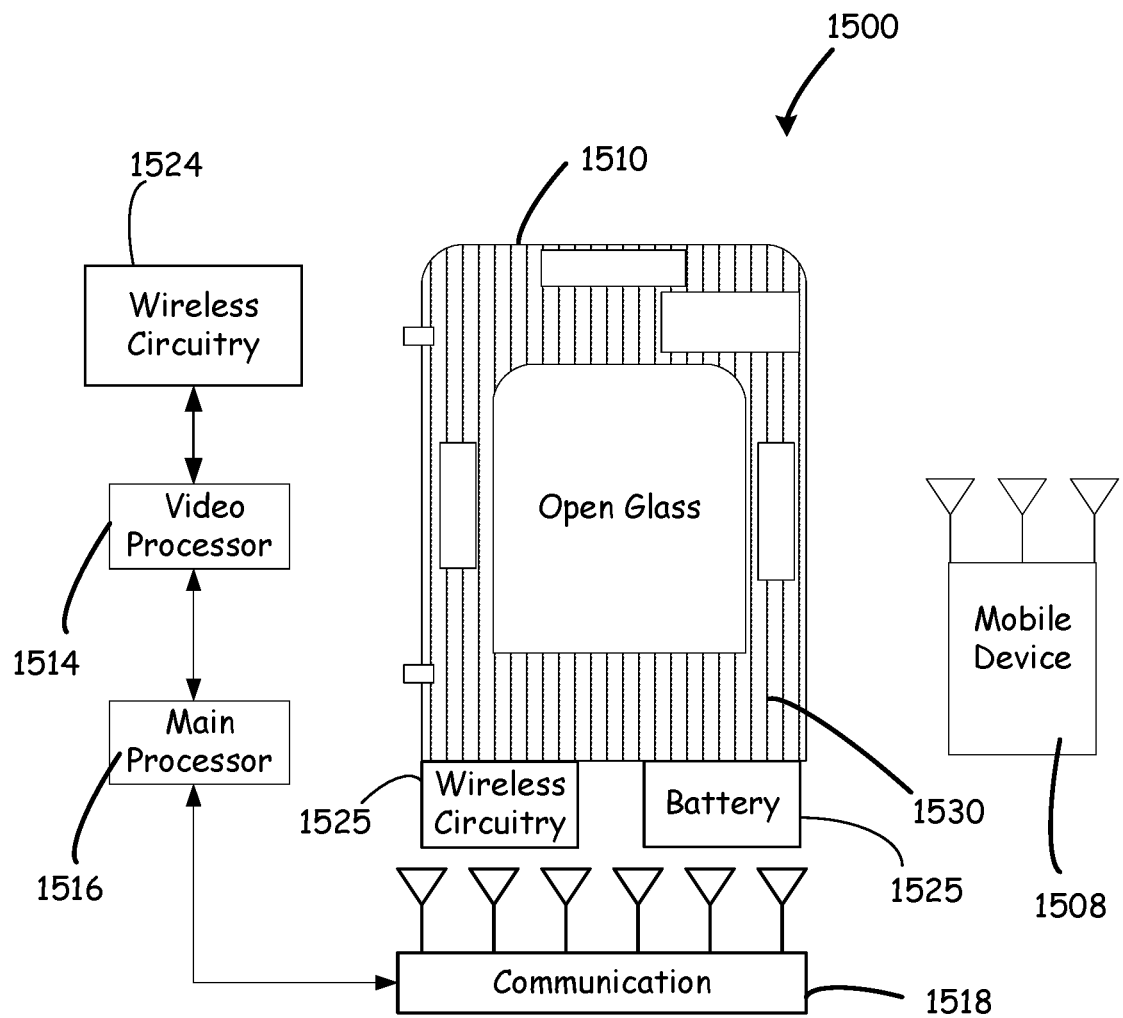
Figures 1, 24:
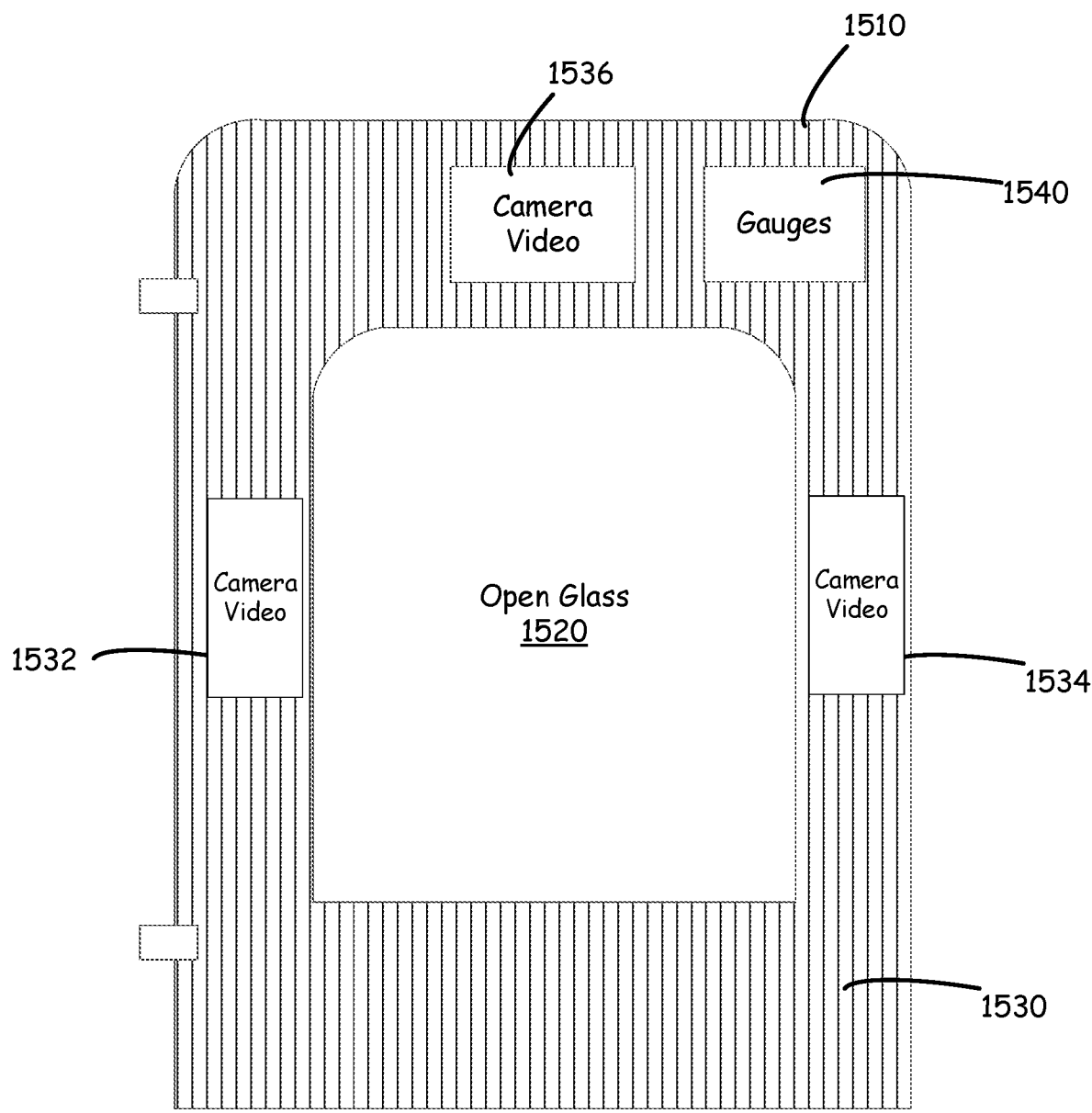
Figures 2, 24:
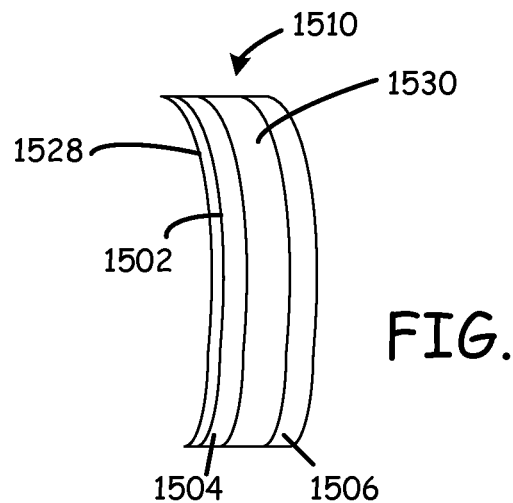
Figures 3, 24:
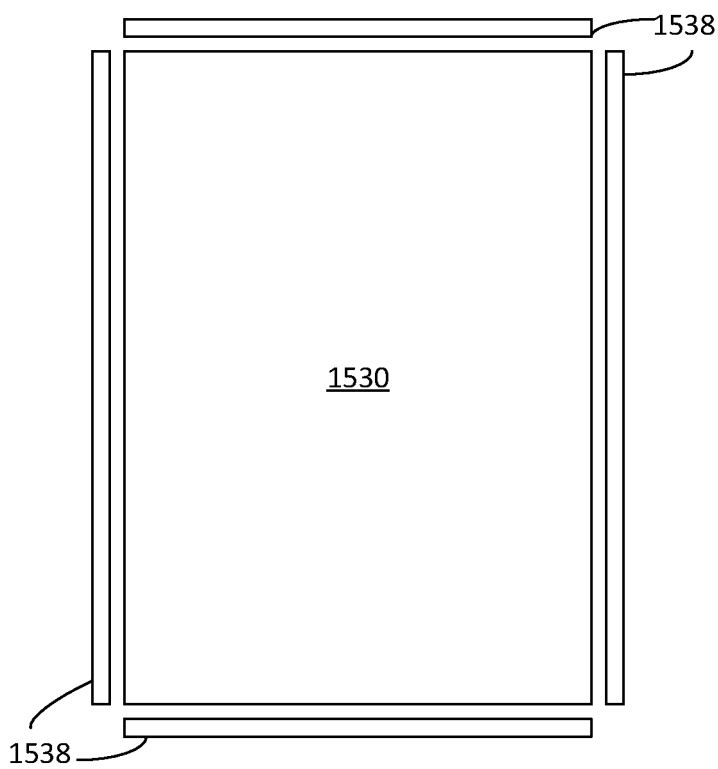

In exemplary embodiments, the display panel 1530 is integrated into at least a portion of the door 1510. For example, as shown in FIGS. 23 and 24, door 1510 can include, in some exemplary embodiments, an open glass area 1520 and an integrated display 1530 closely adjacent to the open glass area. In one example embodiment as shown, the integrated display is positioned surrounding the open glass area 1520, though that need not be the case in all embodiments. No information is displayed in the open glass area 1520, allowing the operator to better see the work area, while the integrated display 1530 is configured to display information closely adjacent to the open glass area such that it is not necessary for the operator to divert visual attention far from the line of sight to the work area.

In some embodiments, integrated display 1530 is an organic light emitting diode (OLED) screen, which is affixed with an adhesive to or otherwise secured or integrated into the door 1510. In exemplary embodiments, the OLED screen is secured to or integrated into glass portions of door 1510. In some embodiments, a bonding process glues the display 1530 to the door using any suitable adhesion to glass techniques and materials. However, in exemplary embodiments, the glass of door 1510 to which display 1530 can be adhered is tempered. In other embodiments, other display technologies are used. In various embodiments, display 1530 must be transparent enough to allow an operator to see through the door reasonably well while at the same time providing well visible, clear display images on the door.

Electrical digital communication or connection to display 1530 can be provided, for example, from the door 1510 to onboard electronics via ribbon cable 1512 that is removably attached to the door. For the purposes of this discussion, electrical digital communication refers to communication streams that provide information to the display from the controller. This digital communication can be provided using various communication protocols. In addition, electrical power can be provided to the display via cables such as ribbon cable 1512. While many doors are pivotable on hinges 1522 about a generally vertical axis, some doors for front entry loader cabs can be overhead doors in that they open by moving above the operator's head. For clarity's sake, the use of the term generally vertical axis is used to differentiate from a generally horizontal axis. Hinges aligned on a generally vertical axis are located on one side of an aperture as opposed to on a top or bottom side of the aperture. Use of the term generally vertical axis describes hinges that are not on a vertical axis because the frame of the cab is sloped on a front side thereof. For example, as shown in FIGS. 31 and 32, a cab 1950 of another power machine 1900 includes a front entry door or door assembly 1910 coupled to a cab frame 1920 and having an integrated display 1930 within the door. The cab door 1910 is coupled to the cab frame by solid linkages 1922 which define a path of the cab door between the closed (FIG. 31) and open (FIG. 32) positions, with the open position having the door be located above a seat 1958 of the operator station 1924 and the closed position sealing the ingress/egress aperture 1904 of the cab. In either of these embodiments, cables can be provided to connect such a door to onboard electronics. In exemplary embodiments, these electrical cables can be routed along or within the hinges 1522 or solid linkages 1922 to connect the display to the controller. Electrical digital communication through electrical cables 1512, which can optionally be routed along or within hinges 1522 or linkages 1922 are represented, for example, in FIG. 23-1 showing such electrical cables routed along hinges 1522. However, in other embodiments, such as shown in FIG. 23-2, the electrical digital communication between the controller and the display can be provided using wireless circuitry 1524 and 1525, such as Bluetooth® circuitry, coupled respectively to the controller and to the display or cab door. Further, while the display can receive power though such electrical cables 1512, in wireless digital communication embodiments, the cab door and integrated display can have a battery 1526 for providing power to the display. The battery 1526 can be rechargeable or replaceable in various embodiments.

In one example embodiment, the onboard electronics can include a video controller or processor 1514, a main controller or processor 1516, and communication circuitry 1518, though the onboard electronics need not have this configuration in every embodiment. For example, the main controller or processor can be any of the above-described controllers, including controllers having integrated augmented control features and controllers which communicate with separate augmented control controllers to display information and/or control the power machine using any of the augmented control techniques and features discussed above. In one exemplary embodiment, the video processor 1514 is in communication with the display 1530 to render the display information onto the screen. The video processor may be any suitable processor/driver software capable of providing display information to the display 1530. The video processor is in communication with a main processor 1516, which will provide machine specific information to the video processor to display information. By machine specific information, this includes information such as video images of the surroundings with obstructions shown, gauge clusters and information, camera images, virtual roads, etc.

In some exemplary embodiments, communication circuitry 1518 is configured to communicate with a mobile device 1508, such as a cell phone or other hand-held computing device, using communication technologies and protocols such as blue-tooth, Wi-Fi, cellular, radio frequency, etc. This allows interaction between the controller or processor 1516 and the mobile device to aid in configuring the processor and/or display 1530. For example, this can allow the mapping of obstacles or obstructions, the teaching of work cycles or tasks, or any of the other augmented control concepts disclosed above.

As shown in more detail in FIG. 24-1, in an exemplary embodiment the display 1530 extends around perimeter regions of the door, with the center of the door having open glass 1520 without display material. The area with the display material, shown generally in the cross-hatched area of FIG. 24-1, can be touch sensitive to allow for input from an operator. Within the display area, various display sections can be shown at different spots on the door. For example, virtual gauges can be shown in display area 1540. In display areas 1532, 1534 and 1536 video feeds from power machine cameras can be displayed to provide the operator with an enhanced view of the work area. Still other information can be displayed in the display area in other embodiments, and the information displayed can be displayed in different locations and in different configurations.

FIG. 24-2 is an illustration of a portion of door 1510 in accordance with an example embodiment having display material 1530 positioned between first and second layers 1504 and 1506 of transparent material. The concave surface 1502 can be a surface of the inner most transparent layer 1504. A layer 1528 of touch sensitive material is coupled to the layer of transparent material and aligned with the display 1530 such that, in response to an operator touching the layer of touch sensitive material, coordinates are related to the controller to provide user input. Using this input technique, the controller is programmable to allow the operator to select areas on the door where information is to be displayed and where an operator can locate user inputs. This touch sensitive material can take on various forms, including capacitive or pressure sensitive. Further, in other embodiments, no touch sensitive material is required to provide user input for integrated display 1530. For example, as shown in FIG. 24-3, infrared light curtain devices or light bars 1538 are shown positioned proximate display 1530. Devices 1538 project and sense infrared light to generate an infrared light curtain proximate the concave surface of the cab door, in alignment with the display 1530. In response to sensing an object (e.g., an operator's finger, a stylus, etc.) using the infrared light curtain, the infrared light curtain devices provide coordinates related to the display to the controller. The display and controller are configured to allow the operator, by input through the sensing the object using the infrared light curtain, to select areas on the door assembly where operational information or user inputs are displayed. Using the infrared light curtain is particularly advantageous to allow the power machine operator to wear gloves which may not be sensed by some touch sensitive material technologies. While light bars are shown on all four sides of the door, in some embodiments (not shown), light bars with sensors and receivers on each bar can be positioned along one of a top and bottom and one of each side so that a single light bar extends vertically and a single light bar extends horizontally.

Figure 25:
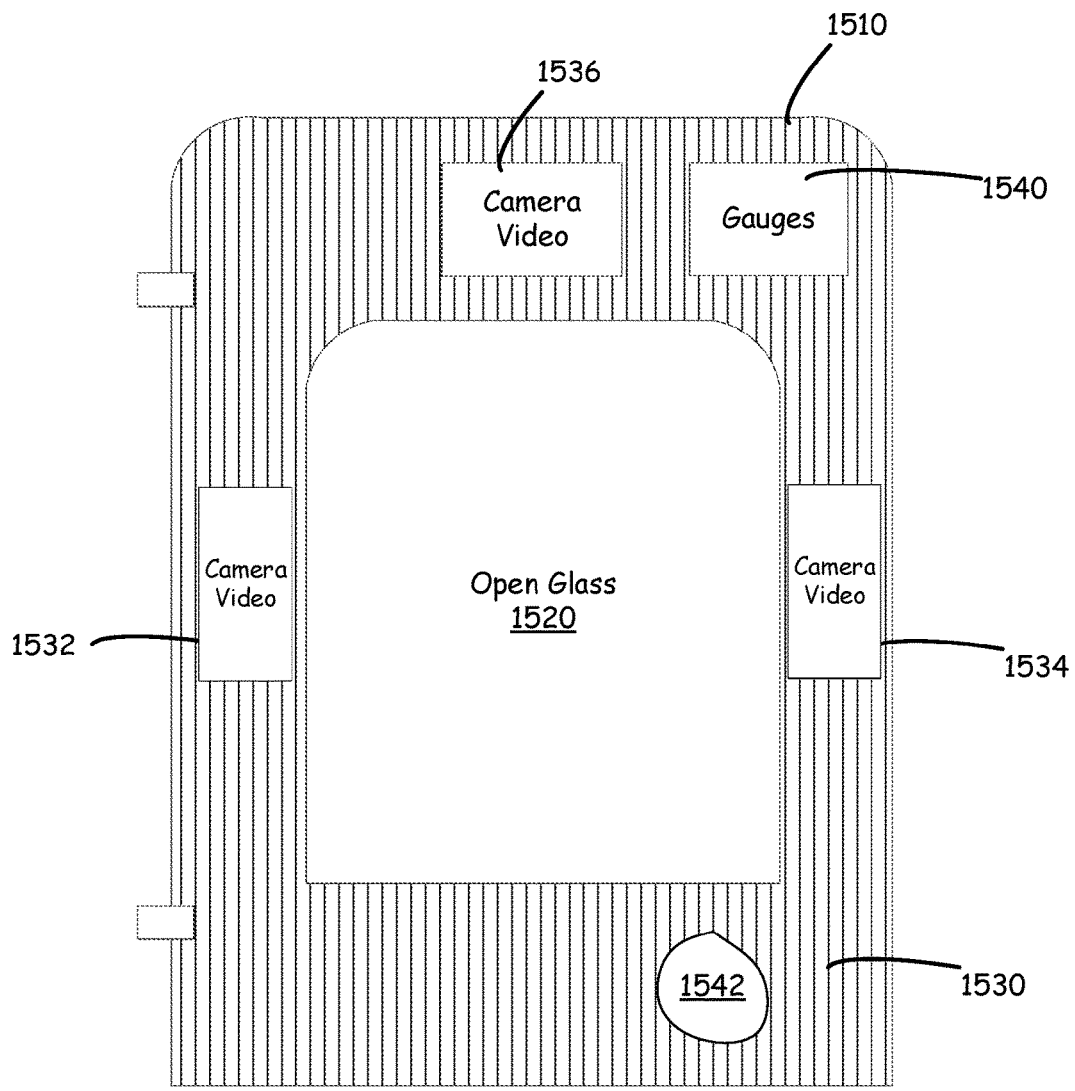
FIG. 25 is a diagrammatic illustration of the door shown in FIGS. 23-24, further showing the display of augmented control information such as a mapped obstacle.

In some exemplary embodiments such as shown in FIG. 25, the display area of display 1530 can be used to display augmented control information such as discussed above. For example, and obstacle or obstruction 1542 which has been mapped can be represented graphically in the display area to provide a visual indication of its location to the operator of the power machine. Other augmented control information, such as boundaries and borders identified in virtual fencing, can also be displayed in the display area. Similarly, virtual roads, repetitive task information, trailing loading path information, etc. can also be displayed. In exemplary embodiments, this augmented information presented by display 1530 is shown to the operator in a manner allowing locations of obstacles and other features to be represented from a pre-defined position perspective of the operator positioned in the operating station of the cab.

Figure 26:
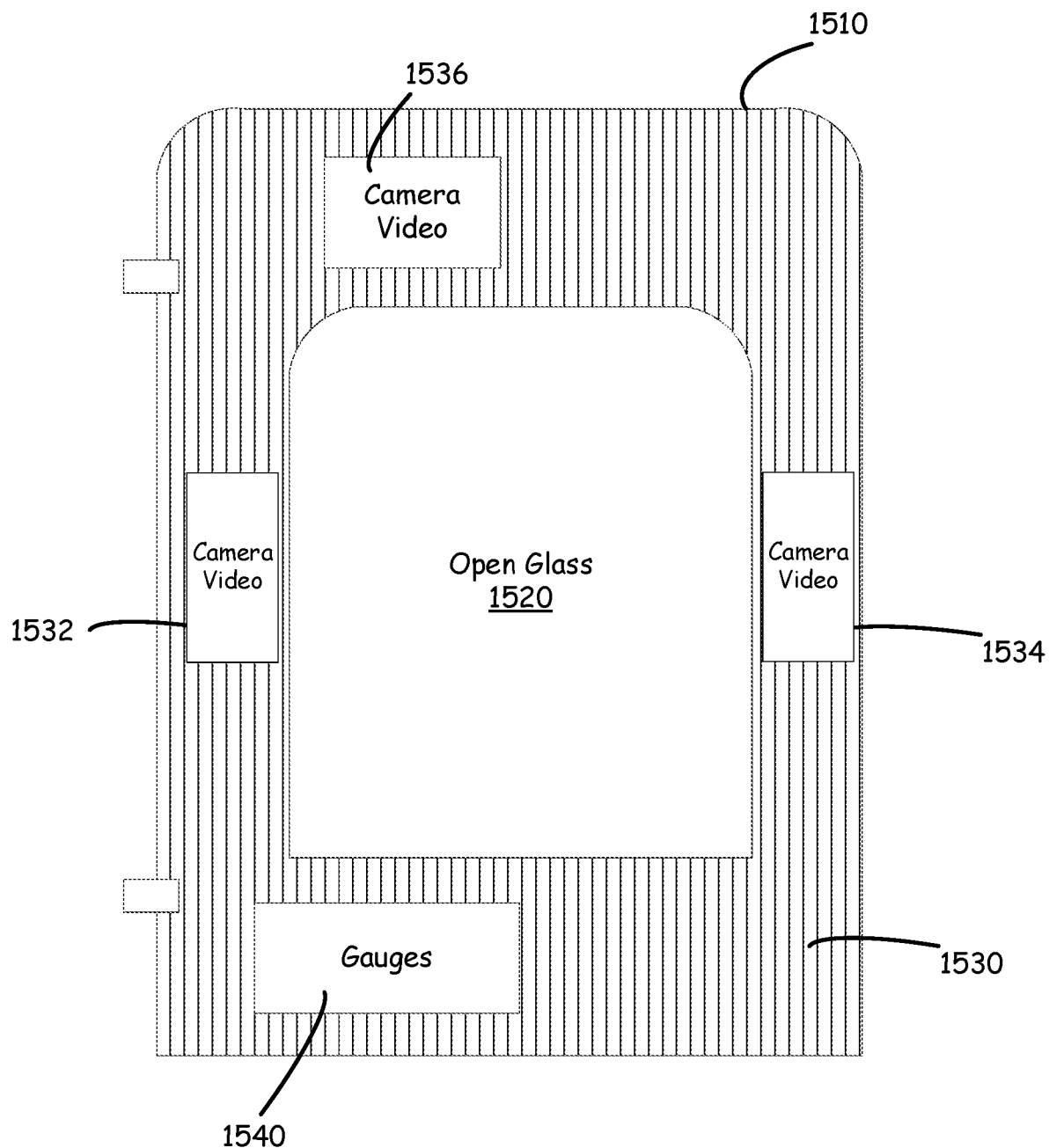
FIG. 26 is a diagrammatic illustration of the door shown in FIGS. 23-25, further showing the reconfiguration of displayed information locations.
Figure 27:
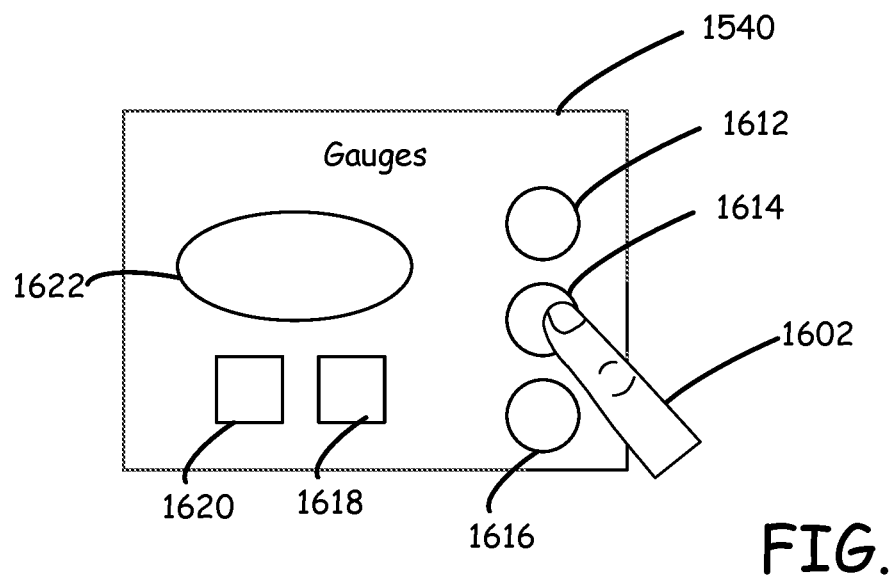
FIGS. 27-28 are diagrammatic illustrations of reconfiguration of a gauge display on the display shown in FIGS. 23-26.
Figure 28:
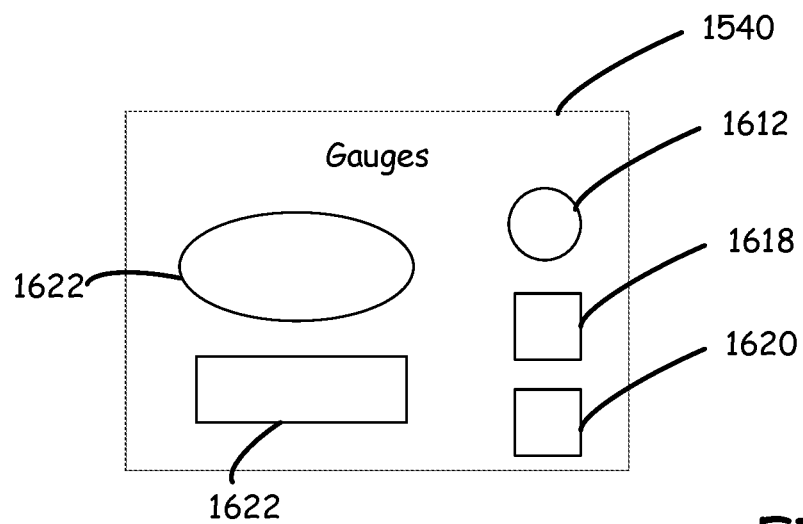

In some embodiments in which display 1530 is a touch screen display, the processors 1514 and 1516 can be configured to allow the reconfiguration of displayed information by the operator. For example, the operator can touch the screen and drag various displayed information to different locations on the display as represented in the reconfigured display arrangement shown in FIG. 26. The operator can similarly add, delete, and change which information is being displayed in some embodiments. For example, referring to FIG. 27, shown is one example arrangement of gauges 1540 having different gauge, displayed information and/or input representations. For example, items 1612, 1614, 1616 and 1622 could represent different displayed gauges, while items 1618 and 1620 could represent displayed data or displayed inputs for interacting with the gauges. Using a finger represented at 1602, the operator of the power machine can move displayed items, delete or hide displayed items, add displayed items. An example of one result of such operator reconfiguration is shown in FIG. 28 where a new item 1622 has been added, items 1614 and 1616 have been removed, and items 1618 and 1620 have been moved.

Figure 29:
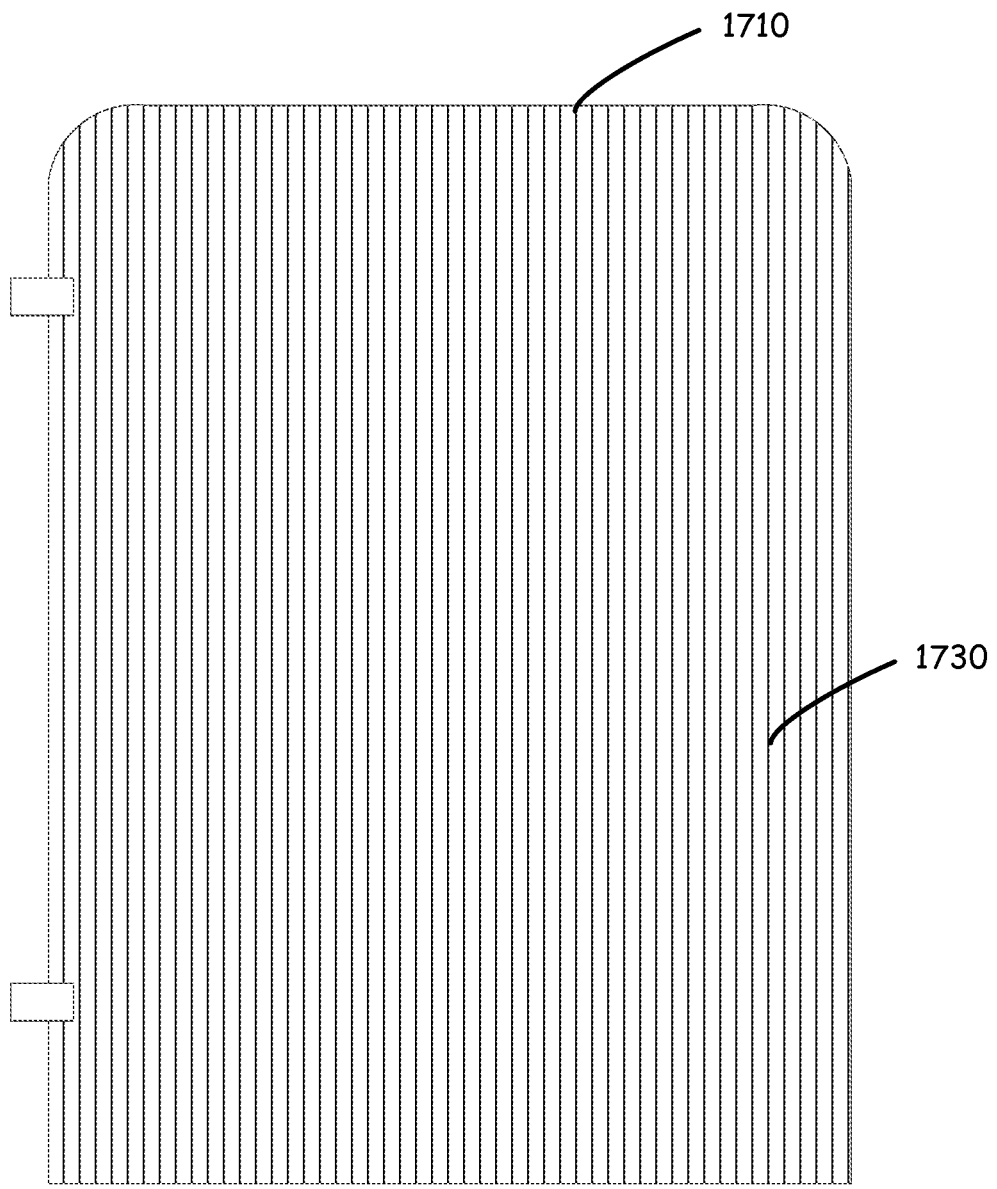
FIG. 29 is a diagrammatic illustration of another exemplary embodiment of a loader door having an integrated display covering the entire glass area of the door.

Although some exemplary embodiments include an open glass region (e.g., 1520) surrounded by display material as represented in FIGS. 23-26, in other embodiments the entire door can be covered in display material. This is shown for example in FIG. 29 where door 1710 includes display 1730 covering substantially the entire glass portion of the door. In still other embodiments a band of material extends across a portion of the door, but not around an entire perimeter of the door. For example, as shown in FIG. 30, door 1810 has a display 1830 including a band of display material across the top of the door, while open glass area 1820 extends across all areas below display 1830. For example, in some embodiments the top 25% of the door may be covered in display material while the remaining portion of the door is free from display material. Various other configurations are considered within the scope of disclosed embodiments.

Further, referring again to FIG. 31, various embodiments can include a second display integrated into a glass window on the side of the power machine. For example, power machine 1900 includes a second display 1940 integrated into glass window 1942 on a side of the power machine. Such a second display can be integrated into any of the above embodiments as well, and can include touch screen or touchless (e.g., infrared light curtain) input technologies as discussed above. Likewise, integrated display features discussed with reference to a particular embodiment are intended to used with other suitable embodiments in accordance with this disclosure. For example, the integrated display and projection display embodiments can be utilized with either a cab with a hinged door or a cab with an overhead door controlled by linkages. Likewise, the augmented reality controller embodiments can be utilized with any of these display embodiments as well. Other combinations are also included with this disclosure.

Although the present invention has been described with reference to preferred embodiments, workers skilled in the art will recognize that changes may be made in form and detail without departing from the scope of the discussion.

What is claimed is:

1. A power machine comprising:
    a cab having a cab frame with an aperture formed on a front side of the cab to allow ingress into or egress from an operating station in the cab;
    a cab door coupled to the cab and being positionable between a closed position, in which the cab door covers at least a substantial portion of the aperture to prevent ingress and egress and an open position, in which the cab door is positioned to allow ingress and egress, the cab door including a layer of transparent material;
    a controller; and
    a display integrated into the cab door and in electrical digital communication with the controller, the display having display material configured to allow at least partial visibility through the display material of a work area outside of the cab, the display further configured to display operational information to an operator of the power machine under control of the controller, wherein the display is attached to a surface of the layer of transparent material.

2. The power machine of claim 1, and further comprising an electrical cable including a plurality of conductors in communication with the controller and the display integrated into the cab door, wherein the electrical cable is capable of moving to maintain communication between the controller and the display when the cab door moves between the open and closed positions.

3. The power machine of claim 2, wherein the cab door is coupled to the cab by hinges such that the cab door is pivotable between the closed and open positions, and wherein the electrical cable extends between the cab door and the cab frame proximal to at least one of the hinges.

4. The power machine of claim 2, wherein the cab door is coupled to the cab by rigid linkages that define a path of the cab door between the closed and open positions, wherein in the open position the cab door is located above a seat of the operator station.

5. The power machine of claim 1, wherein the display integrated into the cab door is configured to display augmented control information including being configured to display mapped obstacles or obstructions from a pre-defined position of an operator positioned in the operating station of the cab.

6. The power machine of claim 1, and further comprising a layer of input sensing material positioned in alignment with the display capable of sensing an operator's intention of selecting a portion of the display and in response to sensing an operator touching the material providing coordinates related to the display to the controller.

7. The power machine of claim 6, wherein the display and controller are configured to allow the operator, by the input through the layer of input sensing material, to select areas on the door where operational information or user inputs are displayed.

8. The power machine of claim 6, wherein the input sensing material is capable of sensing an operator touching the input sensing material.

9. The power machine of claim 6, wherein the input sensing material is capable of sensing an operator or an object manipulated by an operator in close proximity to the input sensing material.

10. The power machine of claim 1, wherein the display is integrated into a concave portion of the door.

11. The power machine of claim 1, and further comprising a second display integrated into a glass window on a side of the power machine.

12. A power machine comprising:
    a cab having a cab frame;
    a controller; and
    a transparent, concave surface on a front side of the cab, wherein the transparent concave surface includes a layer of transparent material; and
    a display coupled to the transparent, concave surface, the display having display material configured to allow at least partial visibility through the display material of a work area outside of the cab, the display further configured to display operational information, to an operator of the loader, under control of the controller, wherein the display is attached to a surface of the layer of transparent material.

13. The loader of claim 12, wherein the layer of the transparent material of the transparent concave surface includes first and second layers of transparent material, and wherein the display is integrated between the first and second layers of transparent material.

14. The loader of claim 12, wherein the display coupled to the transparent concave surface is configured to display augmented control information.

15. The loader of claim 14, wherein the display being configured to display augmented control information includes the display being configured to display mapped obstacles or obstructions from a pre-defined position of an operator positioned in an operator seat of the cab.

16. A power machine comprising:
    a cab having a cab frame;
    a transparent surface coupled to the cab frame the transparent surface including at least two sheets of transparent material;
    a controller;
    a projection device coupled to the controller and configured to project operational information, under control of the controller, for viewing by an operator of the power machine; and
    a transparent, reflective layer integrated into the transparent surface between the at least two sheets of transparent material and providing a projection surface onto which the projection device projects the operational information such that the operator of the power machine can view the operational information while looking through the transparent material forward of the power machine.

17. The power machine of claim 16, wherein the projection device is positioned below an operator seat.

18. The power machine of claim 16, wherein the projection device is positioned to a side of an operator seat.

19. The power machine of claim 16, wherein the transparent surface is part of a door.

20. A power machine comprising:
- a cab having a cab frame;
- a controller; and
- a transparent, concave surface on a front side of the cab; and
- a display coupled to the transparent, concave surface, the display having display material configured to allow at least partial visibility through the display material of a work area outside of the cab, the display further configured to display operational information, to an operator of the loader, under control of the controller; and
- infrared light curtain devices projecting an infrared light curtain proximate the concave surface in alignment with the display and, in response to sensing an object interrupting the infrared light curtain, the infrared light curtain provides coordinates related to the display to the controller where the light curtain is interrupted.

21. The loader of claim 20, wherein the display and controller are configured to allow the operator, by input through the sensing the object using the infrared light curtain, to select areas on the door assembly where operational information or user inputs are displayed.

* * * * *

UNITED STATES PATENT AND TRADEMARK OFFICE
CERTIFICATE OF CORRECTION

PATENT NO. : 11,648,887 B2
APPLICATION NO. : 17/096722
DATED : May 16, 2023
INVENTOR(S) : John Pfaff et al.

It is certified that error appears in the above-identified patent and that said Letters Patent is hereby corrected as shown below:

In the Claims

Column 32, Claim 12, Line 32, please replace the word "loader" with the word --power machine--.

Column 32, Claim 13, Line 35, please replace the word "loader" with the word --power machine--.

Column 32, Claim 14, Line 40, please replace the word "loader" with the word --power machine--.

Column 32, Claim 15, Line 43, please replace the word "loader" with the word --power machine--.

Signed and Sealed this
Second Day of April, 2024

Katherine Kelly Vidal
*Director of the United States Patent and Trademark Office*